United States Patent
Nekoui et al.

(10) Patent No.: US 12,055,640 B2
(45) Date of Patent: Aug. 6, 2024

(54) ERRONEOUS TIME AND LOCATION DETECTION AND CORRECTION

(71) Applicant: QUALCOMM Incorporated, San Diego, CA (US)

(72) Inventors: Mohammad Nekoui, San Diego, CA (US); Soumya Das, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 17/455,387

(22) Filed: Nov. 17, 2021

(65) Prior Publication Data

US 2023/0152471 A1    May 18, 2023

(51) Int. Cl.
*G01S 19/21*    (2010.01)
*G01S 19/25*    (2010.01)
*H04W 56/00*    (2009.01)
*H04W 4/40*    (2018.01)

(52) U.S. Cl.
CPC .......... *G01S 19/215* (2013.01); *G01S 19/256* (2013.01); *H04W 56/0055* (2013.01); *H04W 4/40* (2018.02)

(58) Field of Classification Search
CPC . G01S 19/21–215; G01S 19/256; H04K 3/90; H04W 56/0055
See application file for complete search history.

(56) References Cited

U.S. PATENT DOCUMENTS

| | | | |
|---|---|---|---|
| 9,541,649 B2 * | 1/2017 | Leibner | H04K 3/22 |
| 9,709,682 B2 * | 7/2017 | Achanta | H04K 3/90 |
| 2016/0370470 A1 | 12/2016 | Mabuchi et al. | |

FOREIGN PATENT DOCUMENTS

| | | |
|---|---|---|
| EP | 3495848 A1 | 6/2019 |
| EP | 3805797 A1 | 4/2021 |
| WO | WO-2022159096 A1 * | 7/2022 |

OTHER PUBLICATIONS

International Search Report and Written Opinion—PCT/US2022/078448—ISA/EPO—Jan. 25, 2023.
Qualcomm Incorporated: "Remaining Issues on Timing Error Mitigations for Improved Accuracy", 3GPP TSG RAN WG1 #106-bis-e, R1-2110187, 3rd Generation Partnership Project, Mobile Competence Centre, 650, Route Des Lucioles, F-06921, Sophia-Antipolis Cedex, France, vol. RAN WG1, No. e-Meeting, Oct. 11, 2021-Oct. 19, 2021, Oct. 2, 2021, 10 Pages, XP052059123, The whole document.

* cited by examiner

*Primary Examiner* — Cassi J Galt
(74) *Attorney, Agent, or Firm* — Polsinelli LLP

(57) ABSTRACT

Systems and techniques are described for detecting one or more timing errors. For example, a system can receive, from a navigation system, navigation timestamp information at a first instance and a second instance. The system can determine a navigation system time difference based on the navigation timestamp information at the first instance and the second instance. The system can further receive, from a wireless device, network timestamp information at the first instance and the second instance. The system can determine a network time difference based on the network timestamp information at the first instance and the second instance. The system can further determine whether time reporting by the navigation system is correct based on the navigation system time difference and the network time difference.

27 Claims, 15 Drawing Sheets

ERRONEOUS TIME AND LOCATION
DETECTION AND CORRECTION

FIELD

The present disclosure relates generally to communication systems. For example, aspects of the present disclosure relate to a configuration for detecting and correcting time errors and/or location measurement errors.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects of wireless communication may comprise direct communication between devices, such as in V2X, V2V, and/or D2D communication. There exists a need for further improvements in V2X, V2V, and/or D2D technology. These improvements may also be applicable to other multi-access technologies and the telecommunication standards that employ these technologies.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods and computer-readable media for detecting one or more timing errors and/or one or more location errors. According to at least one example, an apparatus for detecting one or more timing errors is provided. The apparatus includes: at least one transceiver; at least one memory; and at least one processor coupled to the at least one transceiver and the at least one memory, the at least one processor configured to: receive, from a navigation system, navigation timestamp information at a first instance and a second instance; determine a navigation system time difference based on the navigation timestamp information at the first instance and the second instance; receive, from a wireless device, network timestamp information at the first instance and the second instance; determine a network time difference based on the network timestamp information at the first instance and the second instance; and determine whether time reporting by the navigation system is correct based on the navigation system time difference and the network time difference.

In another example, a method for detecting one or more timing errors is provided. The method can include: receiving, from a navigation system, navigation timestamp information at a first instance and a second instance; determining a navigation system time difference based on the navigation timestamp information at the first instance and the second instance; receiving, from a wireless device, network timestamp information at the first instance and the second instance; determining a network time difference based on the network timestamp information at the first instance and the second instance; and determining whether time reporting by the navigation system is correct based on the navigation system time difference and the network time difference.

In another example, a non-transitory computer-readable storage medium is provided that comprises at least one instruction for causing a computer or processor to: receive, from a navigation system, navigation timestamp information at a first instance and a second instance; determine a navigation system time difference based on the navigation timestamp information at the first instance and the second instance; receive, from a wireless device, network timestamp information at the first instance and the second instance; determine a network time difference based on the network timestamp information at the first instance and the second instance; and determine whether time reporting by the navigation system is correct based on the navigation system time difference and the network time difference.

In another example, an apparatus for detecting one or more timing errors is provided. The apparatus includes: means for receiving, from a navigation system, navigation timestamp information at a first instance and a second instance; means for determining a navigation system time difference based on the navigation timestamp information at the first instance and the second instance; means for receiving, from a wireless device, network timestamp information at the first instance and the second instance; means for determining a network time difference based on the network timestamp information at the first instance and the second instance; and means for determining whether time reporting by the navigation system is correct based on the navigation system time difference and the network time difference.

According to at least one other example, an apparatus for determining one or more location errors is provided. The apparatus includes: at least one transceiver; at least one memory; and at least one processor coupled to the at least one transceiver and the at least one memory, the at least one processor configured to: transmit, via the at least one transceiver to a device, a first message comprising a first location estimate of the apparatus; receive, via the at least one transceiver from the device, a second message comprising a second location estimate of the apparatus determined by the device; and determine whether the first location estimate is accurate based on the second location estimate.

In another example, a method for determining one or more location errors by a first device is provided. The method can include: transmitting, to a second device, a first message comprising a first location estimate of the first device; receiving, from the second device, a second message comprising a second location estimate of the first device determined by the second device; and determining whether the first location estimate is accurate based on the second location estimate.

In another example, a non-transitory computer-readable storage medium of a first device is provided that comprises at least one instruction for causing a computer or processor to: transmit, to a second device, a first message comprising a first location estimate of the first device; receive, from the second device, a second message comprising a second location estimate of the first device determined by the second device; and determine whether the first location estimate is accurate based on the second location estimate.

In another example, an apparatus for determining one or more location errors is provided. The apparatus includes: means for transmitting, to a second device, a first message comprising a first location estimate of the first device; means for receiving, from the second device, a second message comprising a second location estimate of the first device determined by the second device; and means for determining whether the first location estimate is accurate based on the second location estimate.

In some aspects, the apparatus is, or is part of, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a vehicle, a server computer, a robotics device, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, a state of the apparatuses (e.g., a temperature, a humidity level, and/or other state), and/or for other purposes.

This summary is not intended to identify key or essential features of the claimed subject matter, nor is it intended for use in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
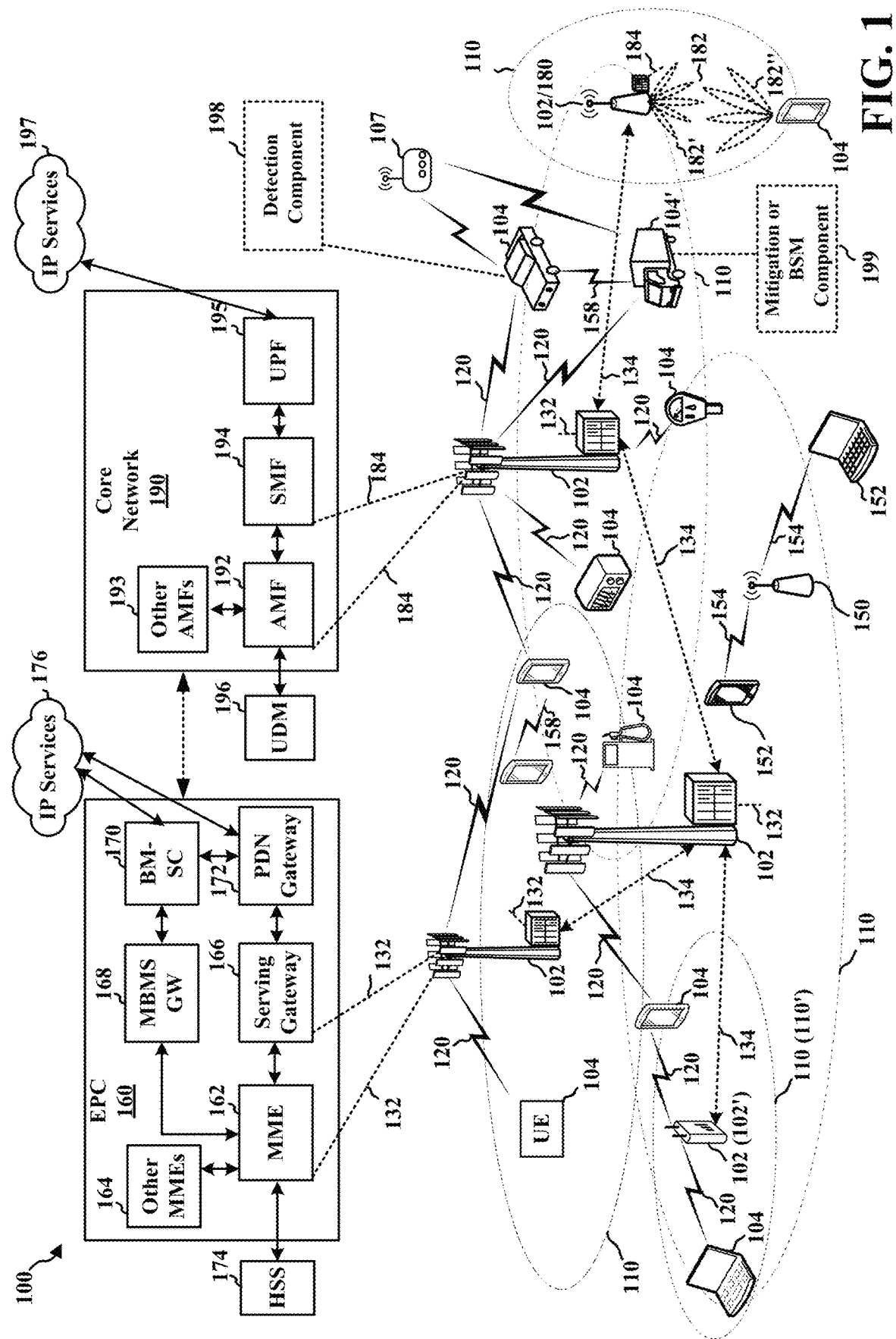
FIG. 1 is a diagram illustrating an example of a wireless communications system and an access network.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein can be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Aspects of the present disclosure relate to features for improving cooperative and navigation decisions by automated devices (e.g., automated driving decisions by vehicles, such as autonomous or semi-autonomous vehicles). For instance, vehicles or other wireless devices may report inaccurate information. In some cases, there may be errors in timing and/or location information reported by wireless devices, such as by vehicles transmitting messages (e.g., cellular vehicle-to-everything (C-V2X) messages). Some such misreporting instances may be performed by malicious entities, while others may be due to perception errors associated with the reporting entity. For example, erroneous timing information may be reported by a navigation infrastructure, such as a Global Navigation Satellite System (GNSS). In another example, time spoofing at a wireless device (e.g., a vehicle) can occur. For instance, time spoofing at the wireless device can occur due to the raw timing information in the GNSS message being spoofed, which can lead to incorrect calculated time and/or position at the wireless device (e.g., vehicle). Further, even if raw data is not spoofed, systematic and random faults by the vehicle software and/or hardware, or malicious access to internal software and/or hardware by outside adversaries, can lead to an incorrect timing source. Erroneous location and timing information at wireless device (e.g., a vehicle) may prohibit transmission of messages (e.g., C-V2X messages) and/or have safety implications that lead to traffic accidents even if messages can be transmitted. Without precise/accurate timing, these wireless devices (e.g., vehicles) are unable to communicate via such messages (e.g., C-V2X messages).

Systems, apparatuses, processes (also referred to as methods), and computer-readable media (collectively referred to herein as systems and techniques) are described herein for identifying (e.g., detecting or determining) and correcting erroneous time and/or location measurement errors. In some aspects, erroneous timing information reported by a navigation infrastructure, such as a GNSS, can be identified by a wireless device (e.g., a host vehicle) by comparing received navigation timestamp information with timestamp information received from a network, such as a Wireless Wide Area Network (WWAN), to which the wireless device is connected. In such aspects, timing differences (e.g., deltas) between timestamps reported by the navigation device (e.g., a GNSS device) and a network entity (e.g., a base station, or RSU, etc.) can be compared to determine if any disparities exist in time reporting from the various systems. In some aspects, small differences may be expected, for example, due to delays caused in the normal operation of software and/or hardware functions, such as propagation delays in transmitting signals from a base station to a wireless device, handover delays, etc. As such, in some cases, timing errors may only be registered if the disparities between navigation timestamps (e.g., navigation deltas) and network timestamps (network deltas) exceed a predetermined threshold.

In some examples, erroneous location reporting can be identified through comparisons of location estimates reported by host vehicle (or ego-vehicle) and estimates of the host vehicle location that are performed by one or more other wireless devices (e.g., remote vehicles (RVs) or other wireless devices) and/or stationary infrastructure devices (e.g., RSUs or other stationary infrastructure devices) In such examples, location estimate information broadcast by the host vehicle (e.g., in one or more Basic Safety Messages (BSMs)) can be verified by other entities (e.g., RVs) with the ability to measure and/or sense the location of the host vehicle. Updated or corrected location information can then be reported back to the host vehicle from one or more RVs. For example, one or more RVs can report back the updated/corrected location information by transmitting one or more messages (e.g., one or more sensor data sharing messages (SDSMs), one or more cooperative perception messages (CPMs), or other message(s)) to the ego vehicle. Depending on the desired implementation, identification of host vehicle location reporting errors can trigger the host vehicle to reschedule transmissions and/or to update location information for the associated wireless device.

Additional aspects of the present disclosure are described in more detail below.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IOT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A base station may operate according to one of several RATs in communication with UEs, road side units (RSUs), and/or other devices depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

A road side unit (RSU) is a device that can transmit and receive messages over a communications link or interface (e.g., a cellular-based sidelink or PC5 interface, an 802.11 or WiFi™ based Dedicated Short Range Communication (DSRC) interface, and/or other interface) to and from one or more UEs, other RSUs, and/or base stations. An example of messages that can be transmitted and received by an RSU includes vehicle-to-everything (V2X) messages, which are described in more detail below. RSUs can be located on various transportation infrastructure systems, including roads, bridges, parking lots, toll booths, and/or other infrastructure systems. In some examples, an RSU can facilitate communication between UEs (e.g., vehicles, pedestrian user devices, and/or other UEs) and the transportation infrastructure systems. In some implementations, a RSU can be in communication with a server, base station, and/or other system that can perform centralized management functions.

An RSU can communicate with a communications system of a UE. For example, an intelligent transport system (ITS) of a UE (e.g., a vehicle and/or other UE) can be used to generate and sign messages for transmission to an RSU and to validate messages received from an RSU. An RSU can communicate (e.g., over a PC5 interface, DSRC interface, etc.) with vehicles traveling along a road, bridge, or other infrastructure system in order to obtain traffic-related data (e.g., time, speed, location, etc. of the vehicle). In some cases, in response to obtaining the traffic-related data, the RSU can determine or estimate traffic congestion information (e.g., a start of traffic congestion, an end of traffic congestion, etc.), a travel time, and/or other information for a particular location. In some examples, the RSU can communicate with other RSUs (e.g., over a PC5 interface, DSRC interface, etc.) in order to determine the traffic-related data. The RSU can transmit the information (e.g., traffic congestion information, travel time information, and/or other information) to other vehicles, pedestrian UEs, and/or other UEs. For example, the RSU can broadcast or otherwise transmit the information to any UE (e.g., vehicle, pedestrian UE, etc.) that is in a coverage range of the RSU.

A radio frequency signal or "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHZ with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly be applied by UE 104 or RSU 107 to communicate with another UE 104 or RSU 107, such as based on sidelink communication such as V2X or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

Base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. Base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), cellular-vehicle-to everything (C-V2X), enhanced V2X (e-V2X), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. Communication based on V2X and/or D2D communication may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

Figure 2:
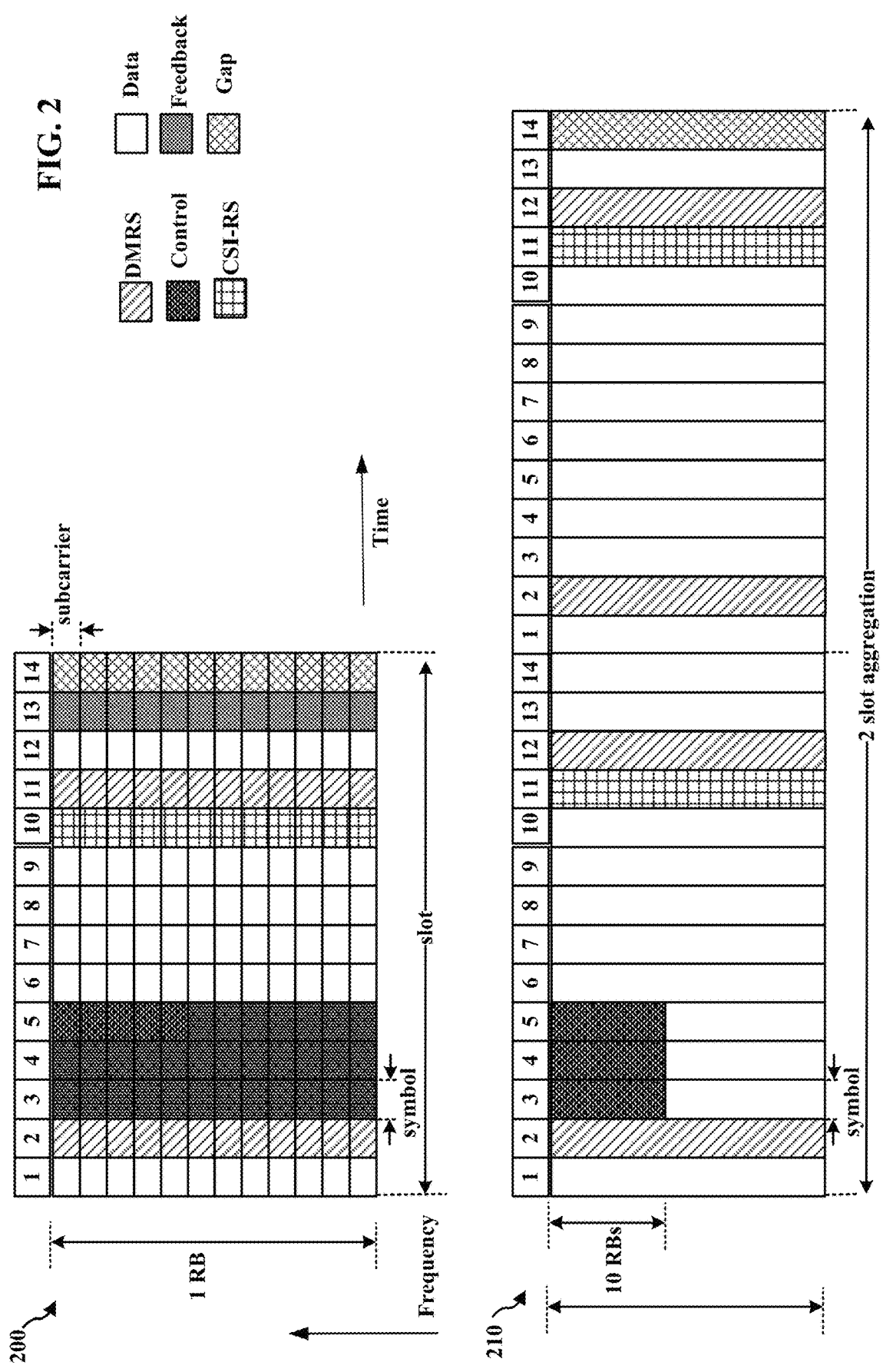
FIG. 2 illustrate example aspects of a sidelink slot structure, in accordance with some aspects of the present disclosure.

FIG. 2 illustrates an example diagram 200 illustrating a sidelink subframe within a frame structure that may be used for sidelink communication, e.g., between UEs 104, between a UE and infrastructure, between a UE and an RSU, etc. The frame structure may be within an LTE frame structure. Although the following description may be focused on LTE, the concepts described herein may be applicable to other similar areas, such as 5G NR, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include two slots. Each slot may include 7 SC-FDMA symbols. For slot configuration 0, each slot may include 14 symbols, and for slot configuration 1, each slot may include 7 symbols. Although the diagram 200 illustrates a single RB subframe, the sidelink communication may include multiple RBs.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include a reference signal, such as a demodulation RS (DMRS). At least one symbol may be used for feedback, as described herein. A symbol prior to and/or after the feedback may be used for turnaround between reception of data and transmission of the feedback. Another symbol, e.g., at the end of the subframe may be used as a guard symbol without transmission/reception. The guard enables a device to switch from operating as a transmitting device to prepare to operate as a receiving device, e.g., in the following subframe. Data or control may be transmitted in the remaining REs, as illustrated. For example, data may be carried in a PSSCH, and the control information may be carried in a PSCCH. The control information may comprise Sidelink Control Information (SCI). The position of any of the reference signals, control, and data may be different than the example illustrated in FIG. 2.

FIG. 2 merely illustrates one, non-limiting example of a frame structure that may be used. Aspects described herein may be applied to communication using other, different frame formats.

Figure 3:
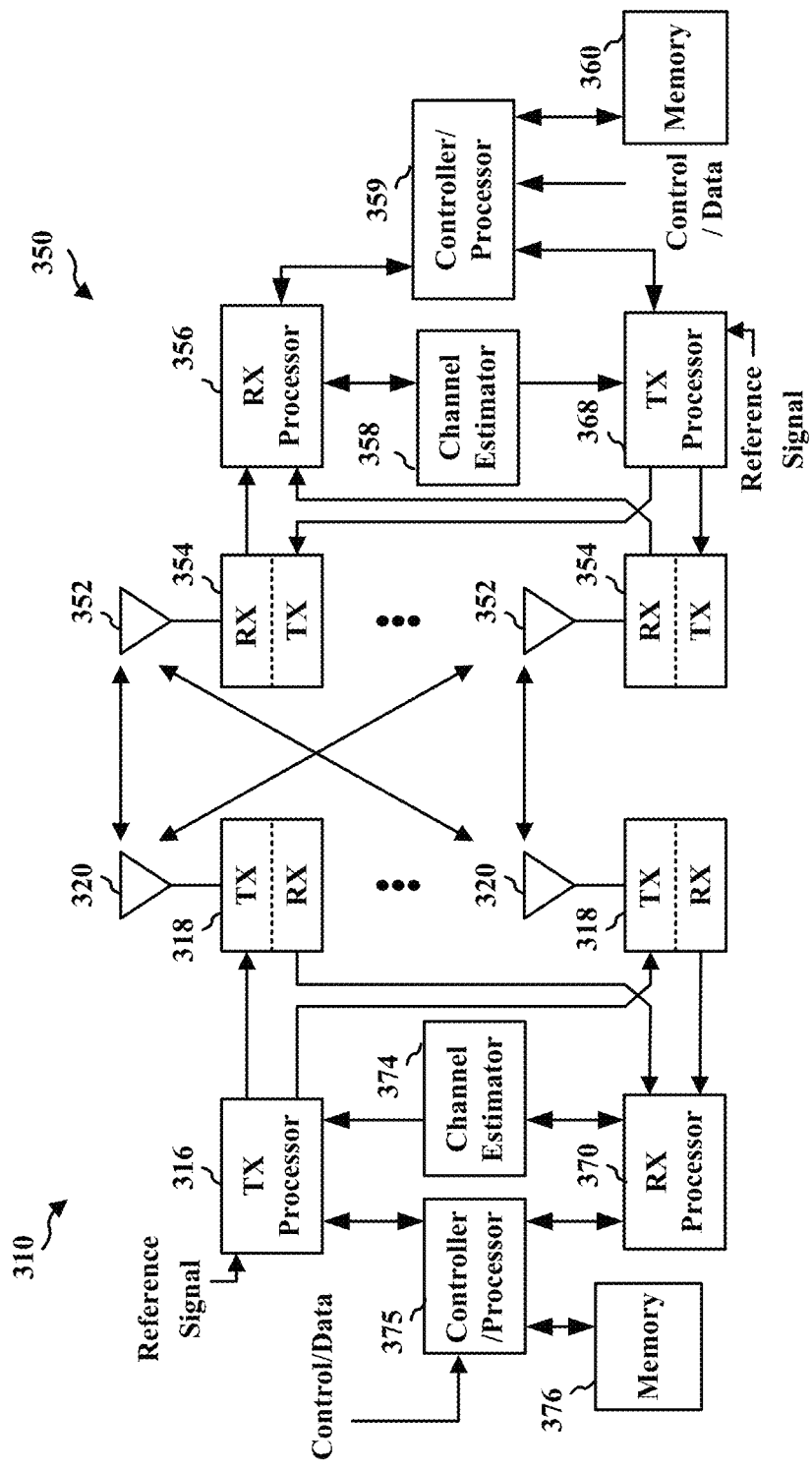
FIG. 3 is a diagram illustrating an example of a first device and a second device involved in wireless communications (e.g., V2V communications, V2X communications, and/or other device-to-device communication), in accordance with some aspects of the present disclosure.

FIG. 3 is a block diagram 300 of a first wireless communication device 310 in communication with a second wireless communication device 350, e.g., via V2V/V2X/other communication. The device 310 may comprise a transmitting device communicating with a receiving device, e.g., device 350. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUS, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with 198 or 199 of FIG. 1.

Figure 4:
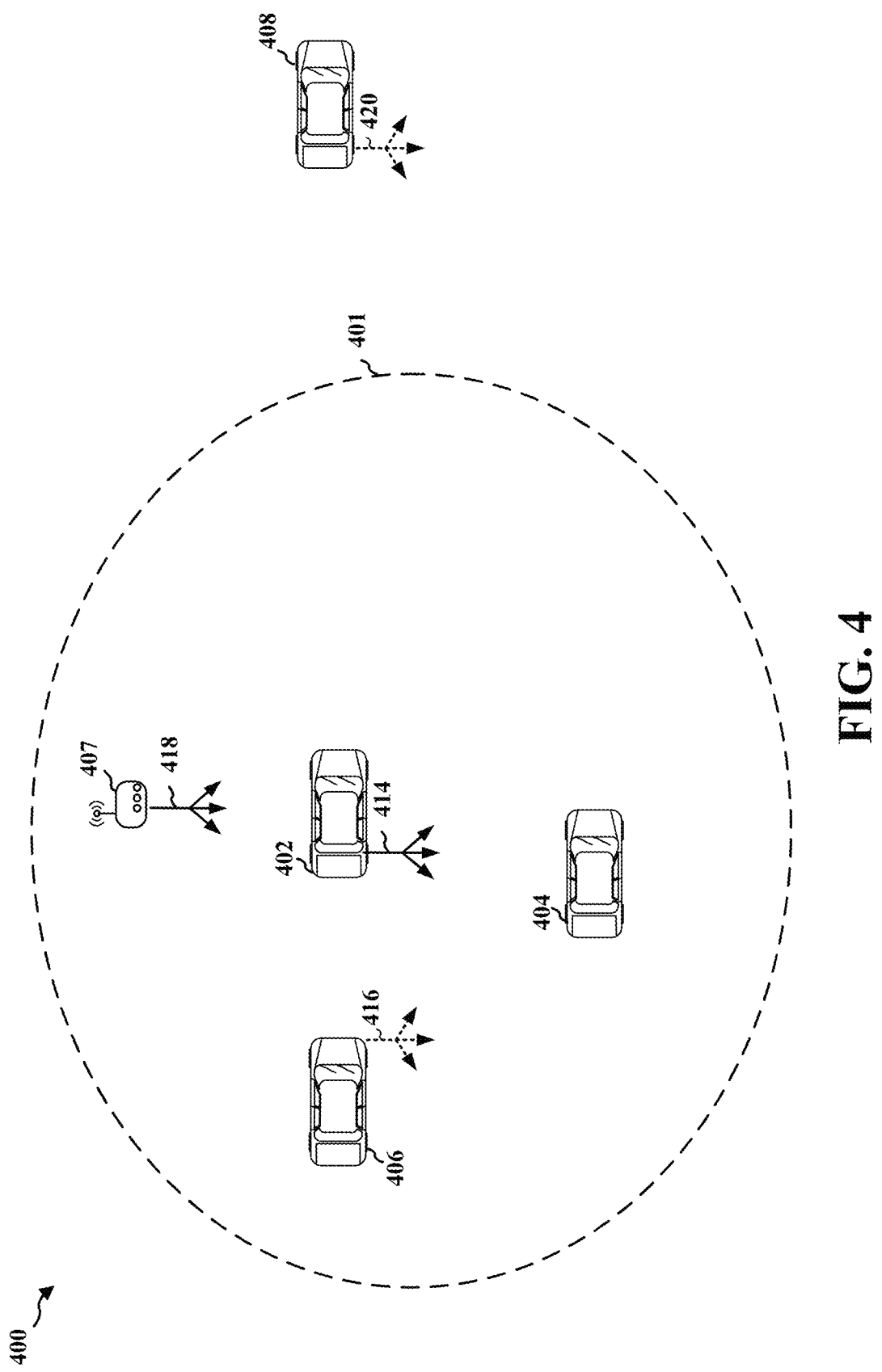
FIG. 4 is a diagram illustrating an example of devices involved in wireless communications (e.g., sidelink communications), in accordance with some aspects of the present disclosure.

FIG. 4 illustrates an example 400 of wireless communication between devices based on sidelink communication, such as V2X or other D2D communication. The communication may be based on a slot structure comprising aspects described in connection with FIG. 2. For example, transmitting UE 402 may transmit a transmission 414, e.g., comprising a control channel and/or a corresponding data channel, that may be received by receiving UEs 404, 406, 408. At least one UE may comprise an autonomous vehicle or an unmanned aerial vehicle. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 402, 404, 406, 408 may each be capable of operating as a transmitting device in addition to operating as a receiving device. Thus, UEs 406, 408 are illustrated as transmitting transmissions 416, 420. The transmissions 414, 416, 420 (and 418 by RSU 407) may be broadcast or multicast to nearby devices. For example, UE 414 may transmit communication intended for receipt by other UEs within a range 401 of UE 414. Additionally/alternatively, RSU 407 may receive communication from and/or transmit communication 418 to UEs 402, 404, 406, 408.

UE 402, 404, 406, 408 or RSU 407 may comprise a detection component, similar to 198 described in connection with FIG. 1. UE 402, 404, 406, 408 or RSU 407 may also comprise a BSM or mitigation component, similar to 199 described in connection with FIG. 1.

Figure 5A:
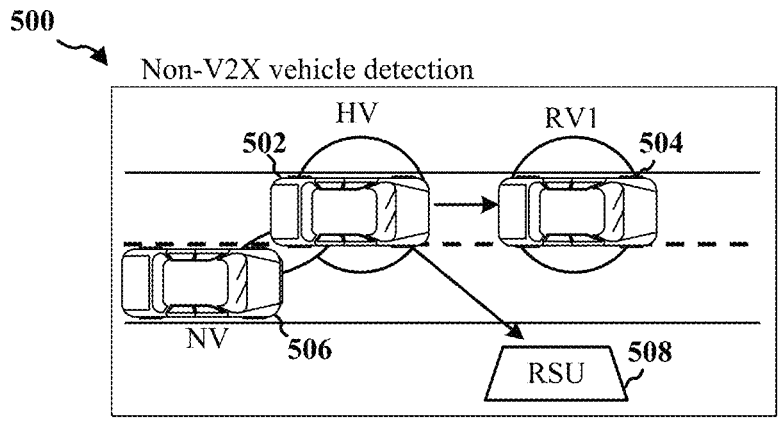
FIGS. 5A-5D are diagrams illustrating examples of sensor-sharing for cooperative and automated driving systems, in accordance with some aspects of the present disclosure.
Figure 5B:
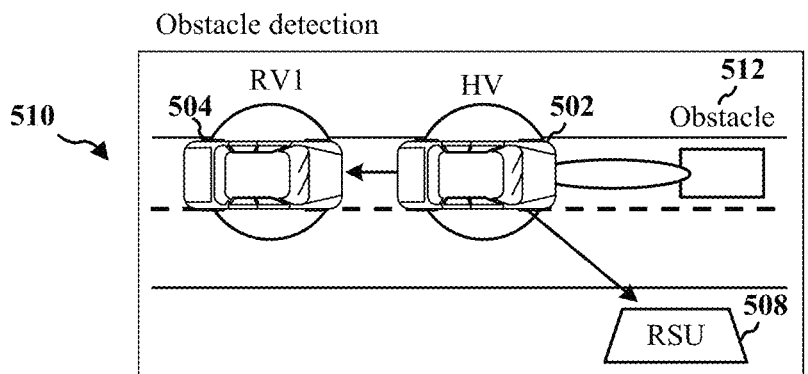
Figure 5C:
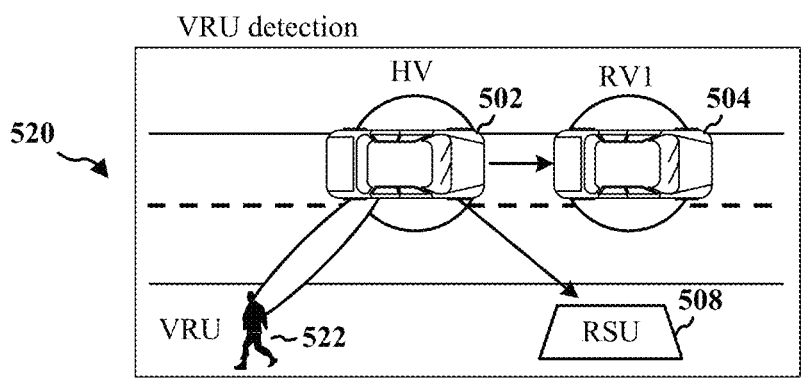
Figure 5D:
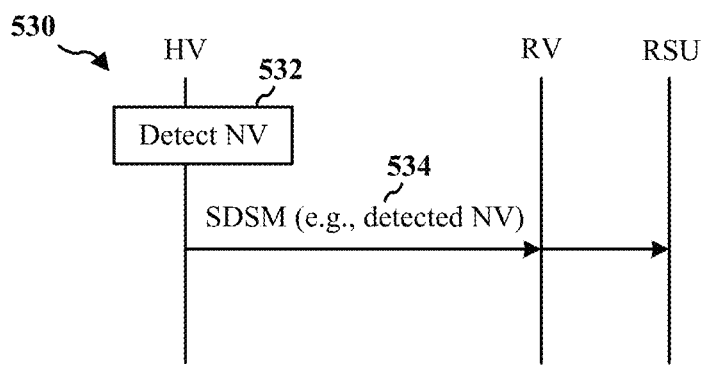
Figure 6:
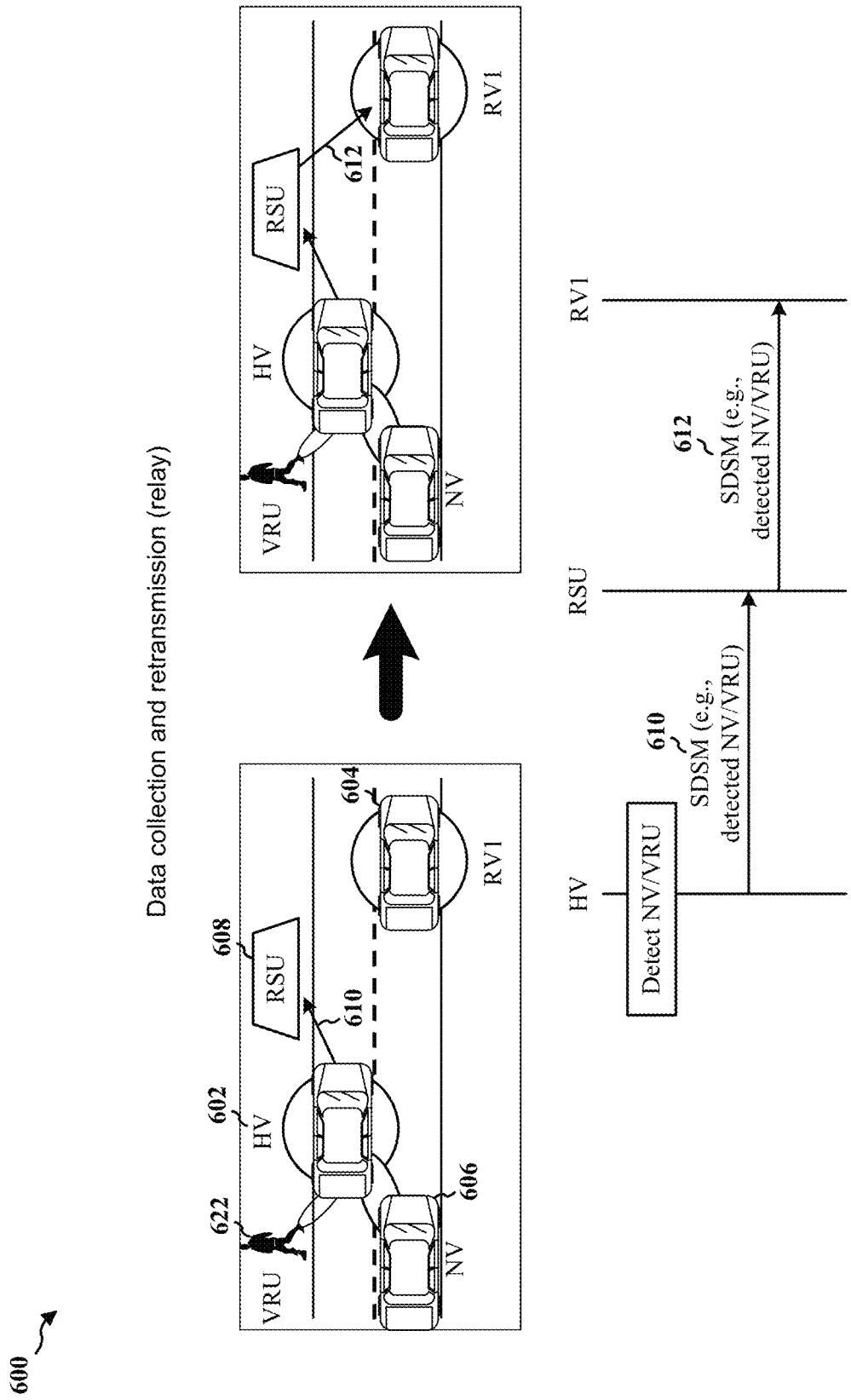
FIG. 6 is a diagram illustrating an example of sensor-sharing for cooperative and automated driving systems, in accordance with some aspects of the present disclosure.

In wireless communications, such as V2X communications, V2X entities may perform sensor sharing with other V2X entities for cooperative and automated driving. For example, with reference to diagram 500 of FIG. 5A, the host vehicle (HV) 502 may detect a number of items within its environment. For example, the HV 502 may detect the presence of the non-V2X entity (NV) 506 at block 532. The HV 502 may inform other entities, such as a first remote vehicle (RV1) 504 or a road side unit (RSU) 508, about the presence of the NV 506, if the RV1 504 and/or the RSU 508, by themselves, are unable to detect the NV 506. The HV 502 informing the RV1 504 and/or the RSU 508 about the NV 506 is a sharing of sensor information. With reference to diagram 510 of FIG. 5B, the HV 502 may detect a physical obstacle 512, such as a pothole, debris, or an object that may be an obstruction in the path of the HV 502 and/or RV1 504 that has not yet been detected by RV1 504 and/or RSU 508. The HV 502 may inform the RV1 and/or the RSU 508 of the obstacle 512, such that the obstacle 512 may be avoided. With reference to diagram 520 of FIG. 5C, the HV 502 may detect the presence of a vulnerable road user (VRU) 522 and may share the detection of the VRU 522 with the RV1 504 and the RSU 508, in instances where the RSU 508 and/or RV1 504 may not be able to detect the VRU 522. With reference to diagram 530 of FIG. 5D, the HV, upon detection of a nearby entity (e.g., NV, VRU, obstacle) may transmit a sensor data sharing message (SDSM) 534 to the RV and/or the RSU to share the detection of the entity. The SDSM 534 may be a broadcast message such that any receiving device within the vicinity of the HV may receive the message. In some instances, the shared information may be relayed to other entities, such as RVs. For example, with reference to diagram 600 of FIG. 6, the HV 602 may detect the presence of the NV 606 and/or the VRU 622. The HV 602 may broadcast the SDSM 610 to the RSU 608 to report the detection of NV 606 and/or VRU 622. The RSU 608 may relay the SDSM 610 received from the HV 602 to remote vehicles such that the remote vehicles are aware of the presence of the NV 606 and/or VRU 622. For example, the RSU 608 may transmit an SDSM 612 to the RV1 604, where the SDSM 612 includes information related to the detection of NV 606 and/or VRU 622.

In some cases, vehicles (or other wireless devices) may include inaccurate information in messages (e.g., C-V2X messages) or may be unable to transmit such messages due to inaccurate measures of location and/or timing information. In some such instances, erroneous timing information may be reported by a navigation infrastructure, such as a Global Navigation Satellite System (GNSS). In some instances, location and/or timing errors may be caused by faulty hardware and/or software. For example, errors in reporting accurate location estimates may be due to sensor malfunction or calibration issues. Inaccurate measurements of time can be due to system delays, such as due to propagation delays, inter-cell synchronization mismatch delays that result from handovers between base stations, mismatches between timing for various Mobile Network Operators (MNOs), and/or other issues. In some cases, location and/or timing errors may be caused by intentional errors, for example, that are introduced by a misbehaving wireless device. In such instances, location estimates and/or timing information may be spoofed, resulting in an inability of the wireless device to effectively transmit messages (e.g., C-V2X messages) and potentially leading to safety consequences for other vehicle, such as traffic accidents.

As noted above, systems and techniques are described herein for identifying (e.g., detecting or determining) and correcting erroneous time and/or location measurement errors, such as errors in timing and/or location reporting by wireless devices (e.g., vehicles transmitting C-V2X messages). In some aspects, a wireless device (e.g., a host vehicle) can identify erroneous timing information reported by a navigation infrastructure, such as a GNSS, by comparing received navigation timestamp information with timestamp information received from a network (e.g., a Wireless Wide Area Network (WWAN)) to which the wireless device is connected. In such aspects, the wireless device (e.g., host vehicle) can compare timing differences (e.g., deltas) between timestamps reported by the navigation device (e.g., a GNSS device) and a network entity (e.g., a base station, or RSU, etc.) to determine if any disparities exist in time reporting from the various systems. In some aspects, small differences may be expected, for example, due to delays caused in the normal operation of software and/or hardware functions, such as propagation delays in transmitting signals from a base station to a wireless device, or handover delays etc. In some approaches, timing errors may only be registered if the disparities between navigation timestamps (navigation deltas), and network timestamps (e.g., network deltas) exceed a predetermined threshold. Further details regarding the detection of location estimation errors is discussed with respect to FIGS. 7, 8, 11, 12, 13, and 15, below.

In some examples, erroneous location reporting can be identified through comparisons of location estimates reported by a host vehicle (or ego-vehicle) and estimates of the host vehicle location that are performed by one or more other wireless devices (e.g., one or more remote vehicles (RVs)) and/or stationary infrastructure devices (e.g., one or more RSUs). In such implementations, location estimate information broadcast by the ego-vehicle, e.g., in one or more Basic Safety Messages (BSMs), can be verified by other entities (e.g., RVs) with the ability to measure and/or sense the location of the host vehicle. Updated or corrected location information can then be reported back to the host vehicle from one or more RVs, for example, via one or more SDSM/CPM received by the host vehicle. Depending on the desired implementation, identification of host vehicle location reporting errors can trigger the host vehicle to reschedule transmissions and/or to update location information for the associated wireless device. Further details regarding the detection of location estimation errors is discussed with respect to FIGS. 9, 10, 11, 12, 13, and 14, below.

Figure 7:
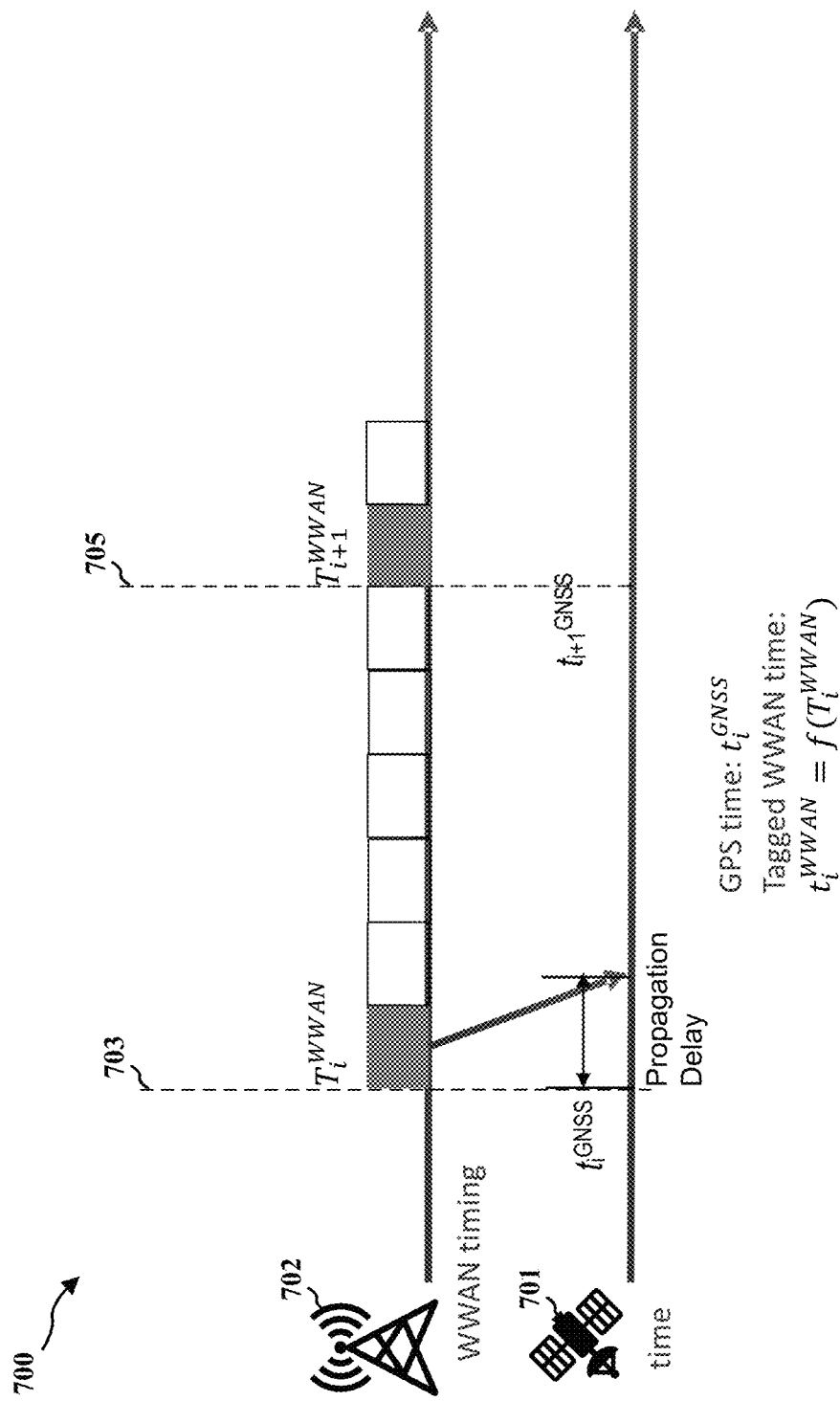
FIG. 7 is a timing diagram illustrating an example of timestamp information reported by a network and a navigation system, in accordance with some aspects of the present disclosure.

FIG. 7 is a timing diagram 700 illustrating an example of timestamp information reported by a network and a navigation system. In the example of FIG. 7, a network entity (e.g., base station 702) connected to a wireless device (not illustrated), provides network timestamp information at two different time instances, such as a first time instance 703 and second time instance 705. Network timestamp information provided at first time instance 703 is indicated as $T_i^{WWAN}$ and network timestamp information provided at second time instance 705 is indicated as $T_{i+1}^{WWAN}$. Navigation timestamp information provided at first time instance 703 is indicated as $t_i^{GNSS}$ and navigation timestamp information provided at second time instance 705 is indicated as $t_{i+1}^{GNSS}$.

In some example, disparities in timing or timekeeping between the network entity (e.g., base station 702) and the navigation device 701 can be determined by comparing differences between timestamps at different instances, e.g., as between first time instance 703 and second time instance 705. For ideal timekeeping scenarios, differences computed (as between instances) for the navigation device 701, and network entity (e.g., base station 702), can be zero, or close to zero. However, in some implementations larger amounts of variability may be permitted before time reporting by navigation device 701 is determined to be erroneous. In such approaches, a threshold may be used when comparing differences between $T_{i+1}^{WWAN}$ and $T_i^{WWAN}$ with differences between $t_{i+1}^{GNSS}$ and $t_i^{GNSS}$. The term $t_i^{GNSS}$ refers to the time acquired from non-spoofed GNSS data at instance i and the term $T_i^{WWAN}$ corresponds to WWAN timing information captured at the same instance i. In some aspects, the threshold can be based on the amount of time delays contributed by various software and/or hardware processes, including but not limited to propagation delays between the network entity (e.g., base station 702) and the wireless device, synchronization delays caused by handovers between the wireless device and different network entities (e.g., base stations, RSUs, etc.), disparities in propagation delays during handovers, delays caused by mismatches between network timing kept by various network entities, such as various Mobile Network Operators (MNOs), etc., and/or other factors. In some implementations, the aforementioned delays can be accounted for by implementing a threshold or spoofing threshold $Spoof_{thresh}$.

For instance, under reliable GNSS coverage, a wireless device (e.g., a vehicle) can "tag" a GNSS time from the navigation device 701 with WWAN time from the base station 702 captured at the same instance. The wireless device (e.g., a vehicle) will receive periodic updates on WWAN timing at predefined intervals depending on its state (e.g., idle or connected state). With this setting, a time-spoofing determination can be made at instance i+1 if the following expression provided by equation (1) is met:

$$|t_{i+1}^{GNSS} - (t_i^{GNSS} + \Delta t_i^{WWAN})| = |\Delta t_i^{GNSS} - \Delta t_i^{WWAN}| > Spoof_{thresh} \quad (1)$$

where the spoofing threshold $Spoof_{thresh}$ represents the aggregate amount of acceptable delay that is tolerated before the timing disparity is deemed to be erroneous or 'spoofed.' The term $\Delta t_i^{WWAN}$ can be defined as $\Delta t_i^{WWAN} = f(T_{i+1}^{WWAN} - T_i^{WWAN})$, where a function $f(\bullet)$ is used to convert WWAN timing information into GNSS time format. In some cases, the term $|\Delta t_i^{GNSS} - \Delta t_i^{WWAN}|$ can also be referred to as an absolute difference between the navigation system time difference $\Delta t_i^{GNSS}$ and the network time difference $\Delta t_i^{WWAN}$. In instances where timekeeping errors are not detected (e.g., where a wireless device such as a vehicle makes a "no spoofing" determination) at the later time instance (e.g., second time instance 705 corresponding to i+1), then network timestamp information at the later time instance (e.g., second time instance 705) can be associated with (or tagged to) timekeeping operations performed by navigation device 701 (e.g., the GNSS WWAN tag can be updated with that of the second time instance 705). A process for identifying or classifying timekeeping errors is discussed in further detail with respect to FIG. 8.

Figure 8:
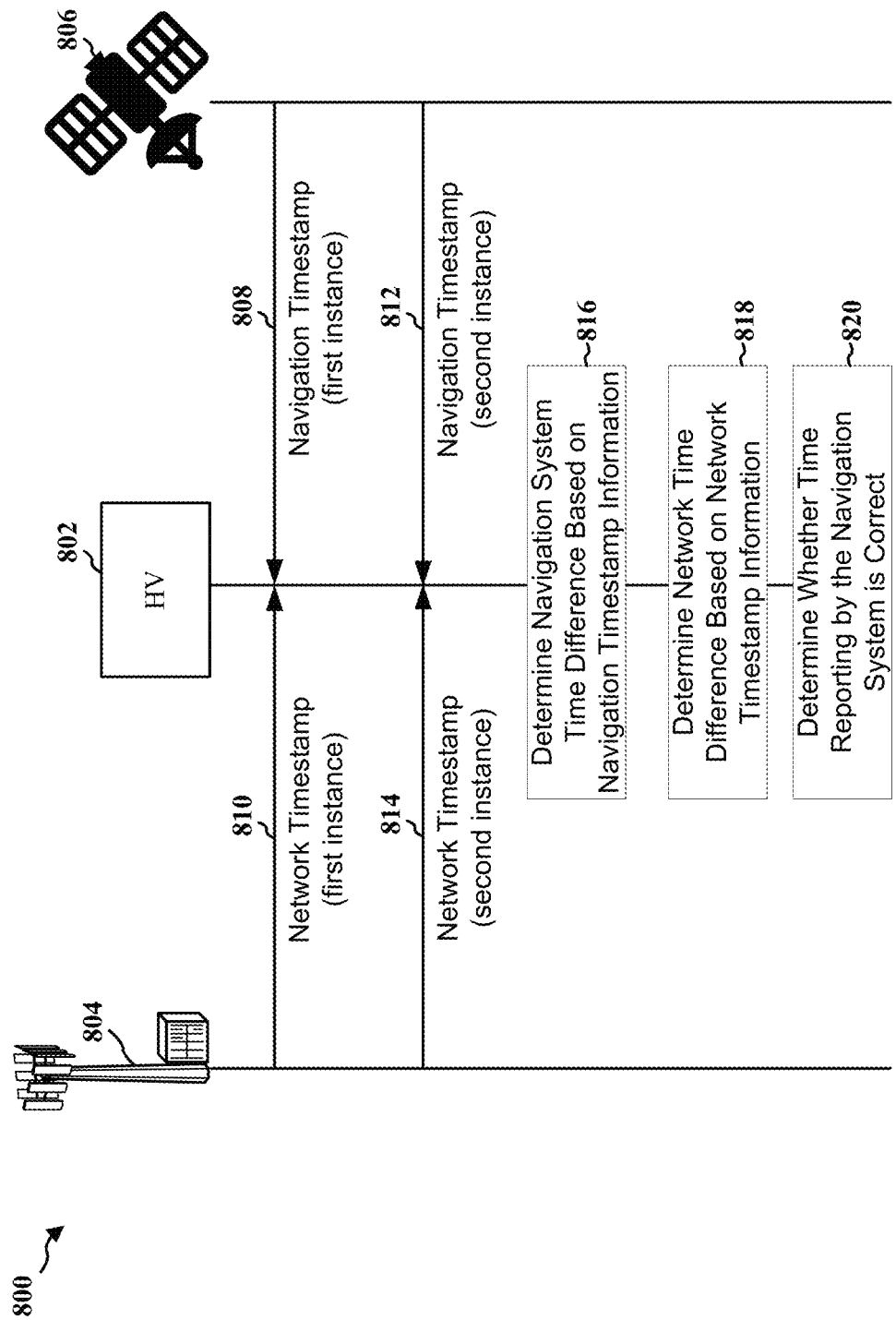
FIG. 8 is a call flow diagram illustrating an example of a process for identifying errors for timestamp information reported by a navigation system, according to some aspects of the present disclosure.

In particular, FIG. 8 illustrates a call flow diagram 800 of an example process for identifying errors for timestamp information reported by a navigation system. In the example of FIG. 8, a host vehicle (HV) 802 receives timestamp information from a network device 804 and timestamp information from a navigation device 806. As illustrated, navigation device 806 provides a navigation timestamp 808 at a first instance, and network device 804 provides a network timestamp 810 at the first instance. At a later time (second instance), additional timestamp information is provided to HV 802 from each device. For example, navigation timestamp 812 is provided to HV 802 by navigation device 806, and network timestamp 814 is provided to HV 802 by network device 804. Once both sets of timestamp information have been received by HV 802, time differences for each can be computed/determined. For example, at block 816, HV 802 can determine a time difference for timestamps provided by navigation device 806 at the first instance (e.g., navigation timestamp 808) and the second instance (e.g., navigation timestamp 812). Similarly, at block 818, HV 802 can determine a time difference from timestamps provided by network device 804 at the first instance (e.g., network timestamp 810) and the second instance (e.g., network timestamp 814). Comparisons made between the determined/computed timing differences can be used to determine whether reporting by the navigation system is correct (block 820). As discussed above, a predetermined threshold (e.g., a spoofing threshold) may be used to compensate for standard or expected delays, such as delays attendant in normal software and/or hardware operations, as discussed with respect to FIG. 7.

Figure 9:
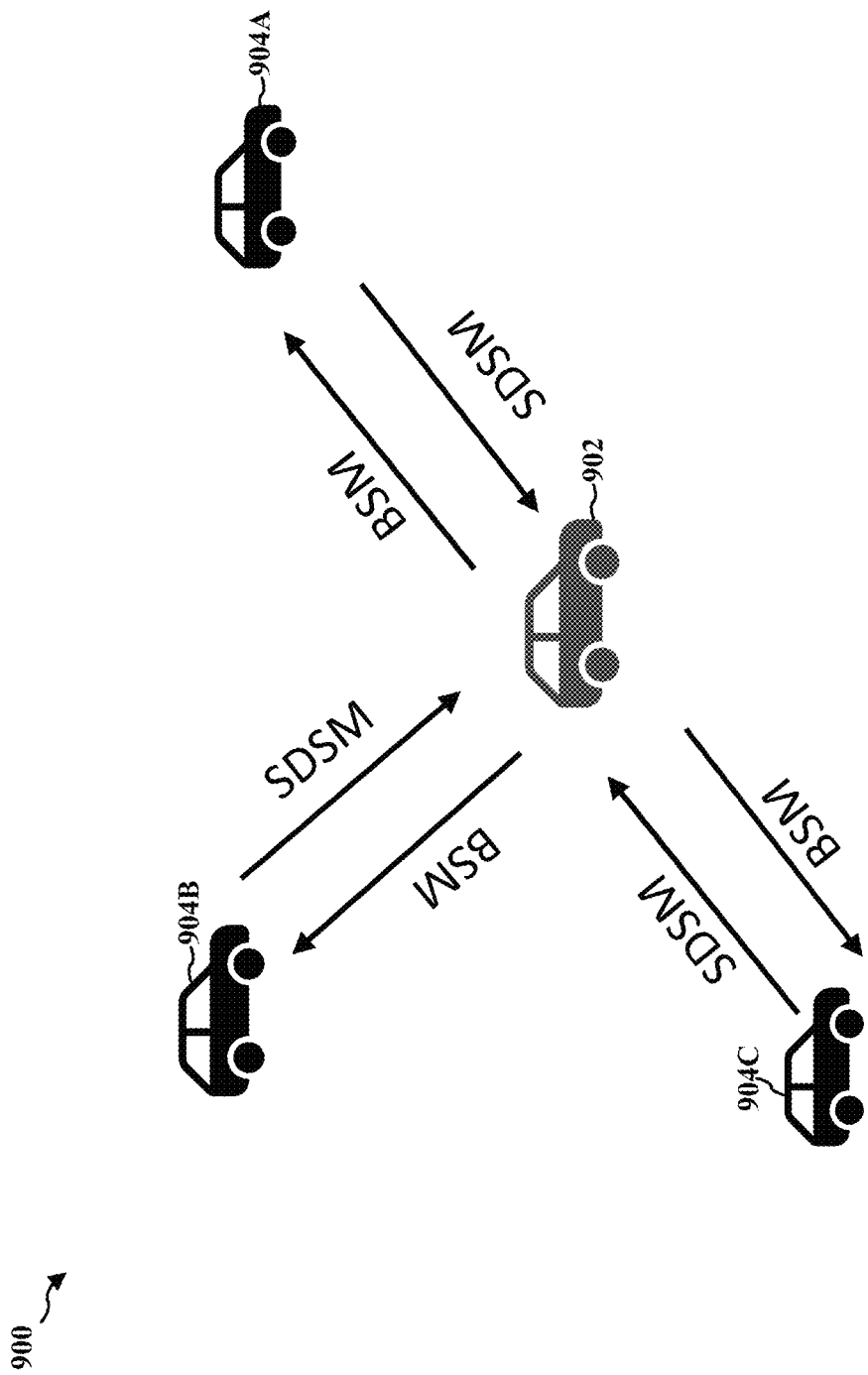
FIG. 9 is a diagram of an example of a communication exchange performed between vehicles that can be used to validate location estimates performed by a host vehicle, according to some aspects of the present disclosure.

FIG. 9 is a diagram 900 of an example communication exchange performed between vehicles that can be used to validate location estimates performed by a host vehicle, e.g., host vehicle HV 902. In the example of diagram 900, HV 902 is shown to broadcast location information via a Basic Safety Message (BSM) to remote vehicles (RVs), including RV 904A, RV 904B, and RV 904C. In operation, RVs 904A, 904B, and/or 904C can receive the BSM from HV 902, and can compare the location estimate reported by HV 902 with measures (or estimates) of the actual location of HV 902.

Depending on the desired implementation, RVs 904 may use various means to estimate an actual location of HV 902. By way of example, one or more of RVs 904 may estimate the location of HV 902 using sensor data collected by one or more on-board sensors, such as one or more: Light Detection and Ranging (LiDAR) sensors, radar sensors, and/or cameras, etc. In some examples, various RVs 904 may estimate a location of HV 902 using various network-based metrics, such as a Received Signal Strength Indicator (RSSI) metric, a sidelink positioning process, or other metric. For instance, the RV 904A, B, and/or C can match an RSSI with the reported HV location. In some examples, a regression model or machine-learning model may be used to correlate a distance between one or more of RVs 904 and HV 902, for example, using RSSI metrics. For instance, a regression model can be trained (e.g., via supervised learning, unsupervised learning, semi-supervised learning, etc.) to correlate distance with RSSI. In some cases, a regression model can be used for RSUs.

Once one or more of the RVs 904A, 904B, 904C have estimated a new (or corrected) location of HV 902, the updated/corrected location of HV 902 can be indicted via message broadcast by the respective RV. By way of example, the new/corrected location of HV 902 can be provided using SDSM/CPM. The SDSM, CPM, or other message transmitted by the RV (e.g., RV 904A, 904B, or 904C) can include the location of the RV, received RSSI from the HV 902, the estimated (or true) location of the HV 902, the claimed (e.g., false) location from the HV 902, and/or other information. For instance, in some aspects, the SDSM/CPM transmitted by the RV 904 can include the false location estimate that was provided by HV 902, e.g., via BSM broadcast. In some examples, HV 902 can be configured to update its location/position estimates based on location information provided by one or more of RVs 904A, B, or C. In some implementations, the updated position information received by HV 902 can be used to identify (e.g., infer), by HV 902, that location reporting is inaccurate, and to stop, delay, or reschedule the broadcast of one or more subsequent measurements. As such, SDSM information received by HV 902, which provides updated/true information about an actual location of HV 902, can be used to trigger corrections to location information indicated in subsequent transmissions (e.g., BMS transmissions) by HV 902, or to halt/cease transmissions entirely.

Figure 10:
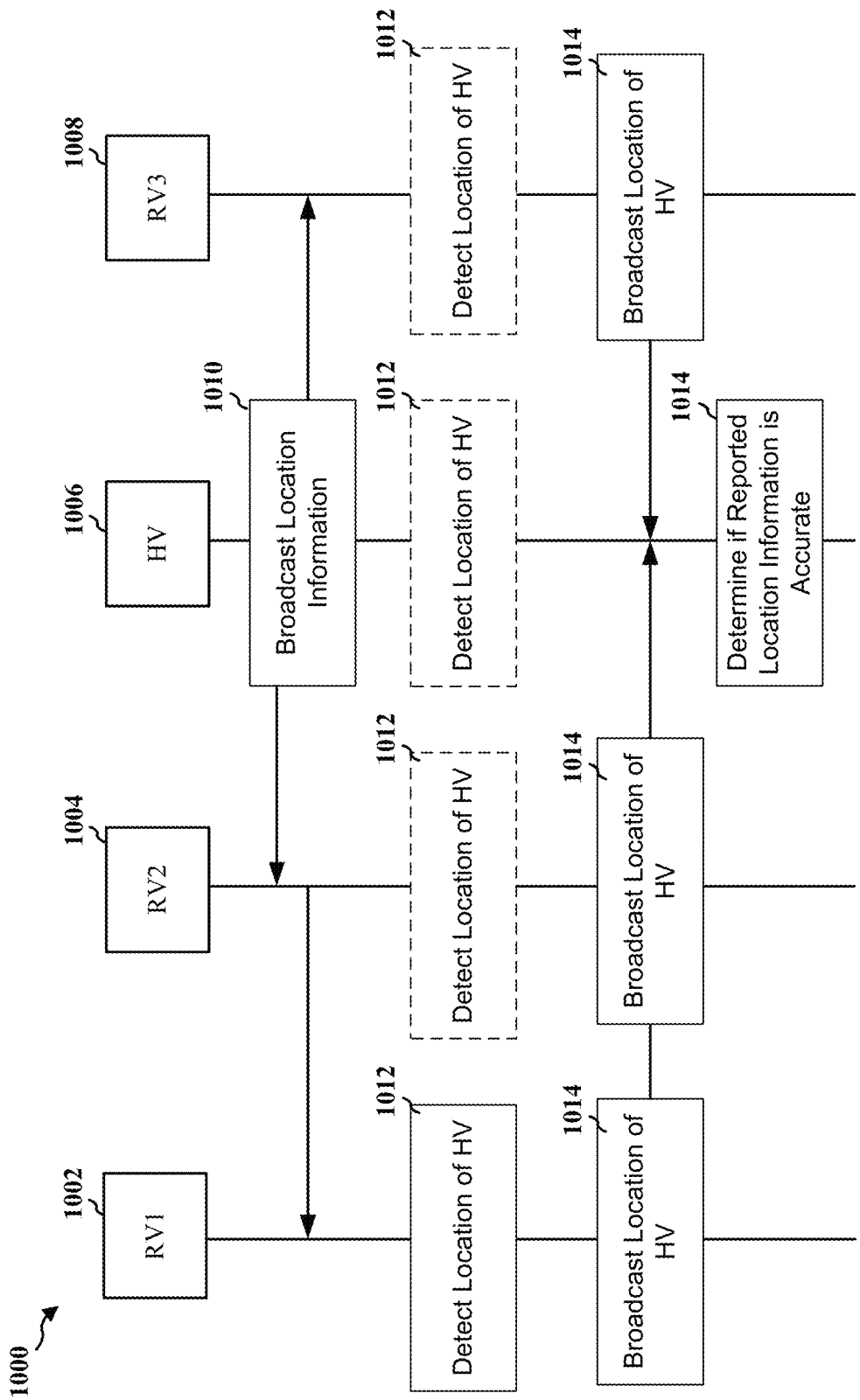
FIG. 10 is a call flow diagram illustrating an example of a process for validating a location estimate performed at a host vehicle, according to some aspects of the present disclosure.

FIG. 10 is a call flow diagram 1000 illustrating an example process for validating a location estimate performed at a host vehicle, such as HV 902. Similar to the diagram illustrated with respect to FIG. 9, call flow diagram 1000 shows multiple remote vehicles (RVs) 1002, 1004, and 1008, in communication with an ego-vehicle/host vehicle (HV) 1006. Initially, HV 1006 transmits/broadcasts a location estimate (block 1010). As discussed above, the location estimate provided by HV 1006 can indicate an estimated location of HV 1006 as measured by one or more onboard systems of HV 1006. Although various message formats may be used, in some implementations the location estimate may be provided in a BSM, for example, that is received by various RVs in the vicinity, e.g., RV1 1002, RV2 1004, and RV3 1008. Once the BSM from HV 1006 has been received by the various RVs, one or more of the RVs can compare the estimated location data from the BSM with independent position/location estimates of HV 1006. For example, RV1 1002 can perform a localization process that identifies a location of HV 1006, e.g., using one or more sensors, and/or utilizing RSSI information corresponding with HV 1006 (block 1012). Depending on the desired implementation and vehicle configurations, one or more additional other RVs may perform a similar localization process, for example, where each RV independently estimates a location of HV 1006. In some examples, the (true or actual) location of HV 1006, as estimated by one or more of RVs 1002, 1004, and/or 1008, can be provided to HV 1006 via a SDSM/CPM that is broadcast by one or more of the RVs (block 1014). By comparing the location estimates received from one or more of RVs 1002, 1004, and/or 1008, HV 1006 can determine if its originally reported location information is accurate. As discussed above, determinations that a location estimate has been incorrectly reported may trigger different actions by HV 1006; for example, HV 1006 may update its location information and/or may halt or reschedule one or more subsequent BSM transmissions.

In some cases, such as when the HV 1006 receives multiple messages (e.g., SDSMs and/or CPMs) from one or more RVs (e.g., from one or more of the RV1 1002, RV2 1004, and/or RV3 1006), the HV 1006 can build trust in their reports based on one or more criteria or factors, such as a type of the RV (e.g., Onboard Unit (OBU), an RSU, or a network entity such as a gNB, a Multi-access Edge Computing (MEC) device, or other network entity), a method used by the RV to detect the erroneous location of the HV 1006, the reliability of the on-board and/or C-V2X sensors of the RV, the number of RVs reporting the erroneous location of the HV 1006, any combination thereof and/or other criteria or factors.

For instance, the HV 1006 can learn to trust a particular RV based on whether the RV is an OBU, an RSU, or a network entity (e.g., a gNB or an MEC). In one illustrative example, the HV 1006 can confide more in data and thus trust the data received from non-OBUs (e.g., an RSU or network entity such as a gNB or MEC) because non-OBUs are stationary, may have better range detection accuracy, and may have more computation power (e.g., in which case the non-OBUs may be more likely to use advanced ranging techniques).

In some examples, the HV 1006 can learn to trust a particular RV based on the method used by the RV to detect the erroneous location of the HV 1006. For instance, the HV 1006 can trust information from an RV more if the RV uses a regression model to detect the erroneous location, such as opposed to RSSI matching or other location detection technique.

In some aspects, the HV 1006 can learn to trust a particular RV based on the reliability of the RV's on-board and C-V2X sensors. For instance, the HV 1006 can consider factors including last calibration status and capabilities of radar sensors, LiDAR sensors, and/or cameras sensors (e.g., if used for ranging), an Automotive Safety Integrity Level (ASIL) rating of the sensors of the RV (e.g., the C-V2X sensor) to ensure functionally safe operation, among others.

In some cases, the HV 1006 can learn to trust a particular RV based on a number of RVs reporting the erroneous location of the HV 1006. For instance, the higher the number of messages received from RVs reporting the erroneous location of the HV 1006, the HV 1006 can consider the messages as being more trustworthy.

In one illustrative example, the HV 1006 can use a metric such as $T=\max(1, \Sigma_{SDSM_i}\alpha_i)$. The term i refers to the SDSM originator (e.g., the particular RV) reporting the erroneous location of the HV 1006. A trust indicator $\alpha_i$ (e.g., $0 \leq \alpha_i \leq 1$) can be assigned to each SDSM originator (e.g., each RV) based on the type of the RV (e.g., OBU, RSU, network entity, etc.), the method used by the RV to detect the erroneous location of the HV 1006, the reliability of the on-board and/or C-V2X sensors of the RV, any combination thereof, and/or based on other factors. The term T can be referred to as a trust metric in some cases. The trust metric includes a summation over all the received SDSMs from the RVs (e.g., RV1 1002, the RV2 1004, and/or the RV3 1008) that are reporting the HV 1006 as having an erroneous location. The higher the T value, the more trustworthy the messages from the RVs (e.g., the RV1 1002, the RV2 1004, and/or the RV3 1008). For example, when T>Threshold (indicating that the RV is reliable or trustworthy), the HV 1006 can determine that location of the HV 1006 that it reported is erroneous based on a high level of trust in the reports (e.g., via SDSMs) from the RVs (e.g., the RV1 1002, the RV2 1004, and/or the RV3 1008). In such cases, a report from a more reliable source (e.g., based on the factors/criteria described above) can amount to that of multiple reports from less reliable or trustworthy RVs. In some cases, the value of Threshold can be determined or chosen in the range of $0 \leq Threshold \leq 1$ based on, for example, the confidence of the HV 1006 in its own on-board sensors that were used to determine its own location, where a higher confidence in its own sensors can result in higher Threshold value (which would require more trustworthy RVs for the Threshold to be exceeded).

Once the HV 1006 is aware or trusts that its own location is erroneous (e.g., the location has been spoofed), the HV 1006 can determine its true location based on messages (e.g., SDSMs) from other devices (e.g., from the RV1 1002, the RV2 1004, and/or the RV3 1008). In some examples, the HV 1006 can perform triangulation or other technique to estimate its true location based on location of RVs and reported indicators of signal strength (e.g., RSSIs) from incoming messages (e.g., from incoming SDSMs). In some cases, the HV 1006 can use a representative value (e.g., a mean or average, a weighted average, or other representative value or metric) of its estimated true location embedded in the messages (e.g., the SDSM messages). In some aspects, the HV 1006 can use the values of the at parameter noted above to assign appropriate weights to contributions from each message originator (e.g., SDSM originator, such as RV1 1002, RV2 1004, and/or RV3 1006) based on their reliability factor.

In some aspects, if one or more of the RVs determine that the HV 1006 is still sending messages (e.g., BSMs) with an erroneous location for a predetermined duration even after being informed through messages from the RVs (e.g., via SDSMs and/or CPMs), the RVs can determine that the HV 1006 is a misbehaving vehicle and can in some cases mark the HV 1006 as a misbehaving vehicle (e.g., in one or more SDSMs and/or CPMs).

Figure 11:
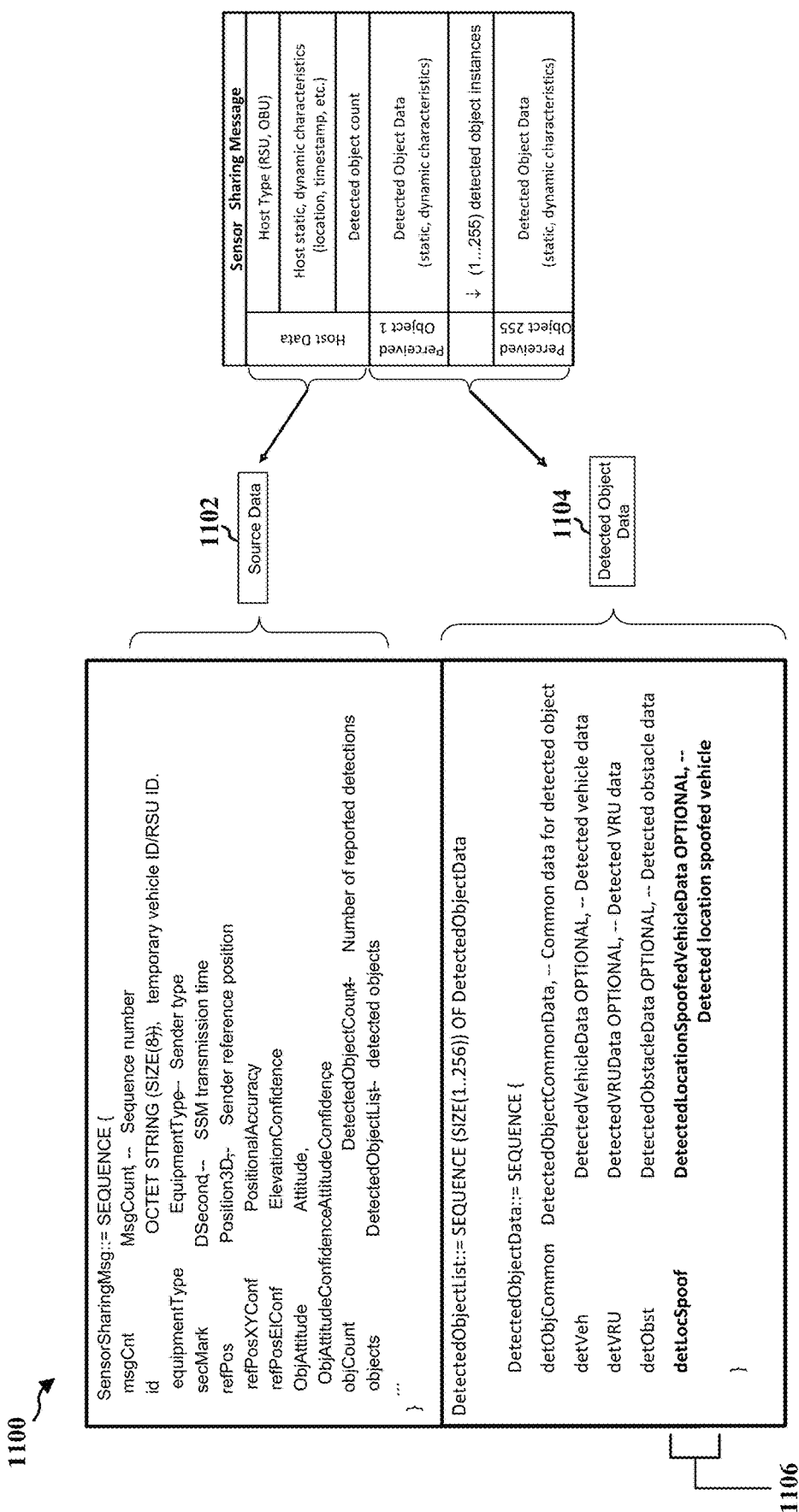
FIG. 11 and FIG. 12 are diagrams illustrating an example of a sensor data sharing message structure, in accordance with some aspects of the present disclosure.
Figure 12:
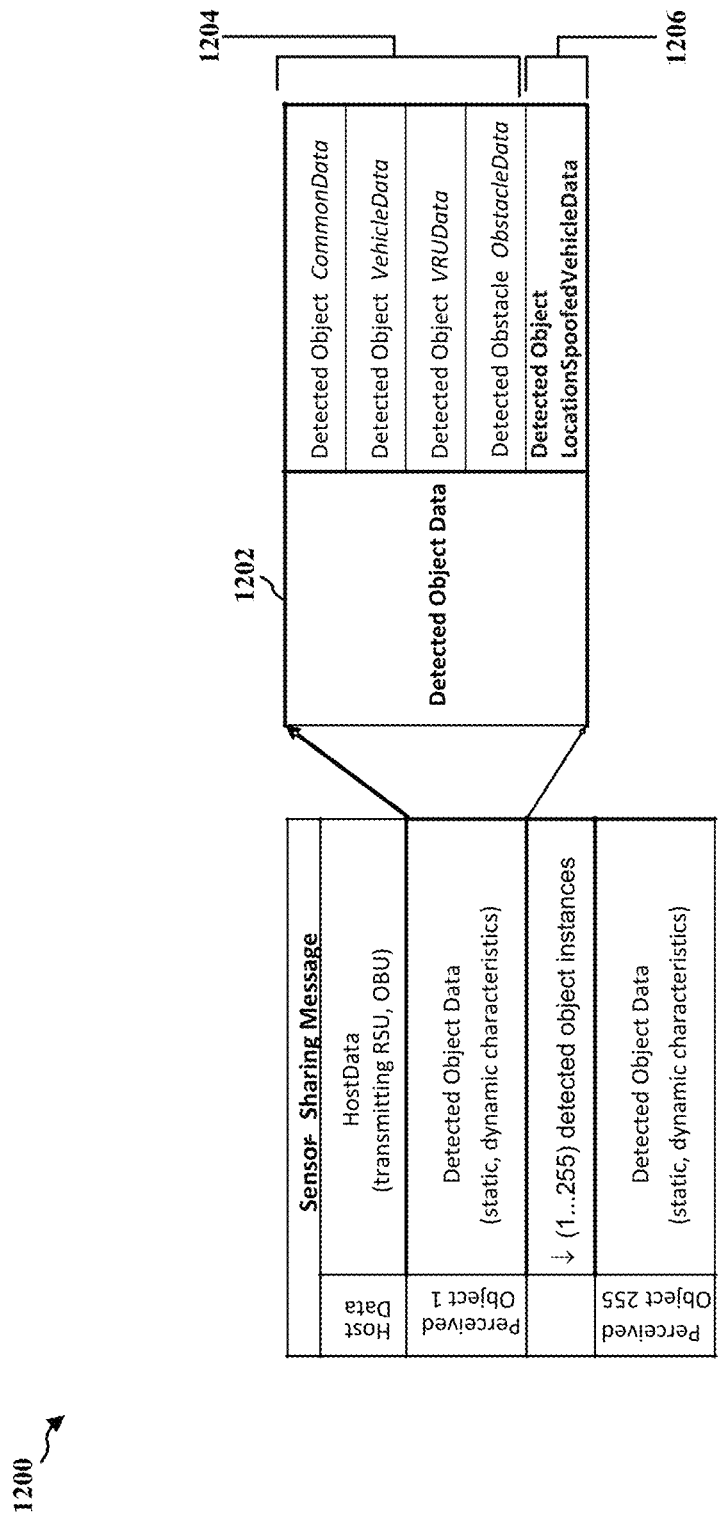

FIG. 11 and FIG. 12 illustrate examples of Sensor Data Sharing Messages (SDSMs), such as SDSMs that can be transmitted by one or more of the RV1 1002, RV2 1004, and/or RV3 1006 and received by the HV 1006 of FIG. 10. In the example SDSM 1100 illustrated in FIG. 11, source data 1102 may include information related to the reporting device, such as the RV1 1002, RV2 1004, and/or RV3 1006 of FIG. 10). Detected object data 1104 may include information, such as information associated with a spoofed vehicle (e.g., the HV 10006 of FIG. 10) that is reported by the reporting device, as discussed above with respect to FIG. 9 and FIG. 10. The data 1106 includes information or data associated with a detected location-spoofed vehicle (e.g., the location-spoofed HV 1006). As shown, the information or data associated with a detected location-spoofed vehicle included in the data 1106 can include a DetectedLocation-SpoofedVehicleData field or information element (IE). The information or data associated with the location-spoofed vehicle (e.g., the DetectedLocationSpoofedVehicle Data field or IE) can include an identifier (ID) (e.g., as Layer 2 (L2) address or other ID) of the location-spoofed vehicle, a temporary ID (or temp ID), a certificate digest, a "claimed" false location of the location-spoofed vehicle that the location-spoofed vehicle reported in a message (e.g., a BSM sent by the location-spoofed vehicle), an indication of signal strength (e.g., a received signal strength indicator (RSSI) or other indicator of signal strength) from the location-spoofed vehicle, the detection method (e.g., using RSSI matching, using sidelink positioning, using one or more regression models, etc.) used by the RV to detect the location-spoofed vehicle (e.g., to determine that the vehicle is misrepresenting itself), any combination thereof, and/or other information. In some cases, common data or information in the SDSM 1100 (shown in FIG. 11 as a DetectedObjectCommonData field or IE) for the detected object (the location-spoofed vehicle) can include the "detected" or estimated position of the location-spoofed vehicle determined by the RV reporting the SDSM 1100.

The diagram 1200 of FIG. 12 further illustrates location-spoofed vehicle data 1206 (e.g., the DetectedLocation-SpoofedVehicleData field or IE of the data 1106 in FIG. 11) in the detected object data 1202 as a particular detected or perceived object (shown as perceived object 1). The detected object data 1202 may further include data 1204 relating to physical obstacles (e.g., potholes, VRUs, non-V2X vehicles), data relating to detected objects that interfere with wireless resources or spectrum used in cooperative and automated driving decisions, and/or other data.

Figure 13:
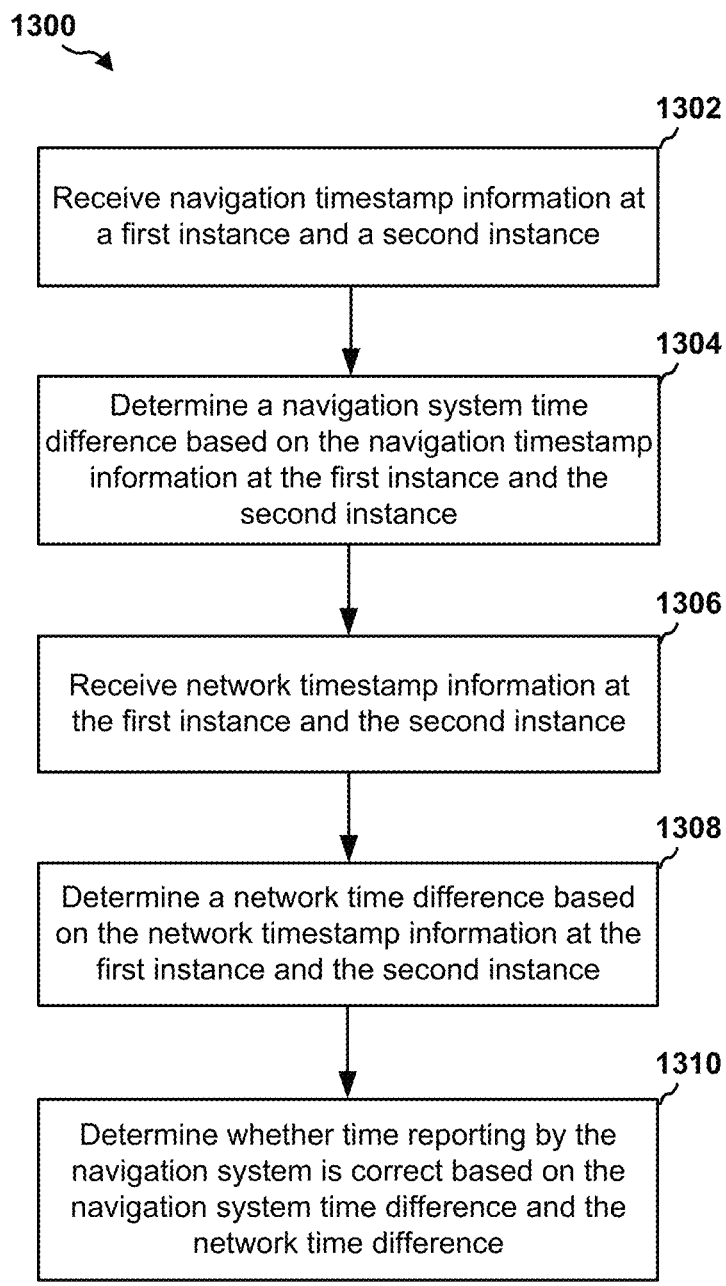
FIG. 13 is a flow diagram illustrating an example of a process for validating timestamp information received from a navigation system, according to some aspects of the present disclosure.

FIG. 13 is a flow diagram of an example process 1300 for validating timestamp information received from a navigation system, according to some aspects of the present disclosure. At block 1302, the process 1300 includes receiving navigation timestamp information (e.g., by a first wireless device) from a navigation system at a first instance and a second instance. As discussed above, the first wireless device can be a vehicle, or a vehicle system, such as an Onboard Unit (OBU). The navigation system can include a global navigation satellite system (GNSS) or other navigation system.

At block 1304, the process 1300 includes determining a navigation system time difference based on the navigation timestamp information at the first instance and the second instance. At block 1306, the process 1300 includes receiving, from a second wireless device, network timestamp information at the first instance and the second instance. In some implementations, the second wireless device is a network entity, such as a base station, e.g., a gNodeB (gNB) or a Roadside Unit (RSU), or the like.

At block 1308, the process 1300 includes determining a network time difference based on the network timestamp information at the first instance and the second instance. At block 1310, the process 1300 includes whether time reporting by the navigation system is correct based on the navigation system time difference and the network time difference. In some aspects, comparisons of time differences (deltas) between systems, e.g., between the navigation system and the network, can include a function or transformation of one time format into the other. For example, a conversion may be performed to convert a timestamp from a Wireless Wide Area Network (WWAN) format, into a Global Navigation Satellite System (GNSS) format, and vice versa.

As discussed above, a threshold (or predetermined threshold) may be used to determine when time reporting is in error. For example, if differences (deltas) between navigation system timestamps and network timestamps exceed a threshold, then time keeping may be determined to be in error, e.g., for the navigation system. In one example, to determine whether time reporting by the navigation system has been spoofed based on the navigation system time difference and the network time difference, the process 1400 can include determining an absolute difference between the navigation system time difference and the network time difference and determining that the time reporting by the navigation system has been spoofed based on a determination that the absolute difference exceeds a spoofing threshold. In some cases, the spoofing threshold is based on a propagation delay from the wireless device to the apparatus, a Time Division Duplex (TDD) synchronization mismatch associated with the wireless device, a disparity in propagation delays experience by the apparatus during network handovers, a mismatch between network timing of various Mobile Network Operators (MNOs), or any combination thereof.

In some examples, the process 1300 can include associating the network timestamp information at the second instance with the navigation system based on a determination that that the time reporting by the navigation system has not been spoofed. For example, a vehicle can update its reference time with the network timestamp information at the second instance. The updated reference time can then be used to transmit one or more messages (e.g., BSMs, SDSMs, etc.) or for other operations.

Figure 14:
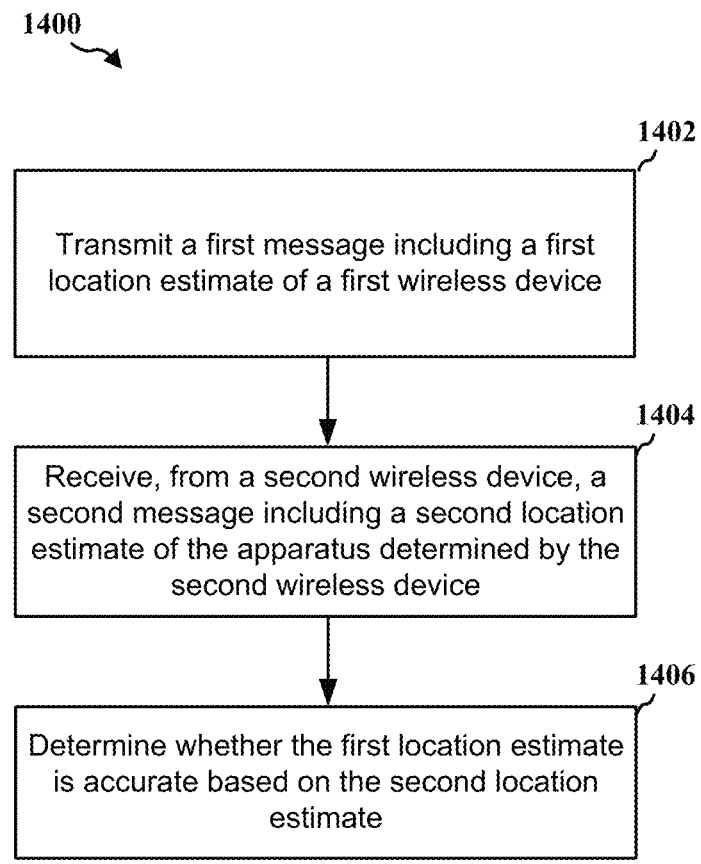
FIG. 14 is a flow diagram illustrating an example of a process for validating a detected object, in accordance with some aspects of the present disclosure.

FIG. 14 is a flow diagram of an example process 1400 for validating a detected object, in accordance with some aspects of the present disclosure. At block 1402, a first wireless device (e.g., a host vehicle, an On-Board Unit (OBU) of a host vehicle, etc.) can transmit a first message including a first location estimate of the first wireless device. The first location estimate is an estimated location of the first wireless device (e.g., host vehicle). In some implementations, the first message can include a Basic Safety Message (BSM). For instance, the first wireless device can transmit the first location estimate in a BSM, as discussed above with respect to FIG. 10.

At block 1404, the process 1400 includes receiving, from a second wireless device (e.g., a remove vehicle), a second message including a second location estimate of the first wireless device (e.g., host vehicle) determined by the second wireless device. In some examples, the second wireless device is a vehicle, Road Side Unit (RSU), or other device. In some implementations, the first message can include a Sensor Data Sharing Message (SDSM).

In some examples, the second location estimate can be received from a remote vehicle (RV), for example, that has independently estimated/measured a location of the first wireless device. By way of example, the second wireless device can determine the second location estimate based on sensor data (e.g., LiDAR, radar, and/or camera data) that is collected by one or more onboard sensors of the second wireless device. In another example, the second wireless device can determine the second location estimate based on a Received Signal Strength Indicator (RSSI) metric (e.g., by matching an RSSI with the first location estimate of the first wireless device). In another example, the second wireless device can determine the second location estimate based on a sidelink positioning process. In another example, the second wireless device can determine the second location estimate based on a trained regression model (e.g., that correlates distance with RSSI).

At block 1406, the process 1400 includes determining, by the first wireless device, whether the first location estimate is accurate based on the second location estimate. By way of example, the first wireless device may compare the second location estimate of the first wireless device with the first location estimate of the wireless device. In cases where the different location estimates differ by a significant threshold (e.g., beyond the magnitude of typical positioning errors or sensor noise), then the first wireless device can use the second location estimate to update its position/location information. In some implementations, a detection of erroneous reporting by the first wireless device trigger changes to location reporting activities performed by the first wireless device. For example, the first wireless device may determine not to transmit (e.g., halt or cease transmission of) one or more messages based on a determination that the first location estimate is inaccurate. In another example, the first wireless device may delay or reschedule one or more planned BSM transmissions based on a determination that the first location estimate is inaccurate.

In some examples, the process 1400 can include determining a level of trust for the message based on one or more factors associated with the second wireless device and one or more other wireless devices (e.g., one or more other remote vehicles). For instance, the one or more factors associated with the second wireless device and the one or more other second wireless devices can include a device type, a method used to determine location estimates of the first wireless device, reliability of one or more sensors of the first wireless device and the one or more other wireless devices, a number of devices reporting an erroneous location estimate of the apparatus, or any combination thereof. In some cases, to determine whether the first location estimate is accurate based on the second location estimate, the process 1400 can include updating a trust metric based on the one or more factors associated with at least one of the device and the at least one other device. In one illustrative example, the trust metric can include $T=\max(1, \Sigma_{SDSM_i} \alpha_i)$ as described above. The process 1400 can include determining whether the trust metric is greater than a threshold (e.g., the Threshold described above) and determining whether the first location estimate is accurate based on whether the updated trust metric is greater than the threshold. In some cases, the process 1400 can include determining that the first location estimate is inaccurate based on a determination that the trust metric is greater than the threshold. For instance, if an HV determines that the trust metric is greater than the threshold, the HV can determine that the first location estimate is inaccurate.

In some cases, the process 1400 can include determining an additional location estimate of the apparatus based on a location of the device and at least one location of at least one other device and based on an indication of signal strength reported in the second message and at least one indication of signal strength reported in at least one message of the at least one other device. In some cases, the process 1400 can include determining an additional location estimate of the apparatus based on the second location estimate of the apparatus included in the second message and at least one location estimate of the apparatus included in at least one message of at least one other device. For instance, to determine the additional location estimate of the apparatus, the process 1400 can include determining an average of the second location estimate of the apparatus included in the second message and the at least one location estimate of the apparatus included in the at least one message of the at least one other device.

Figure 15:
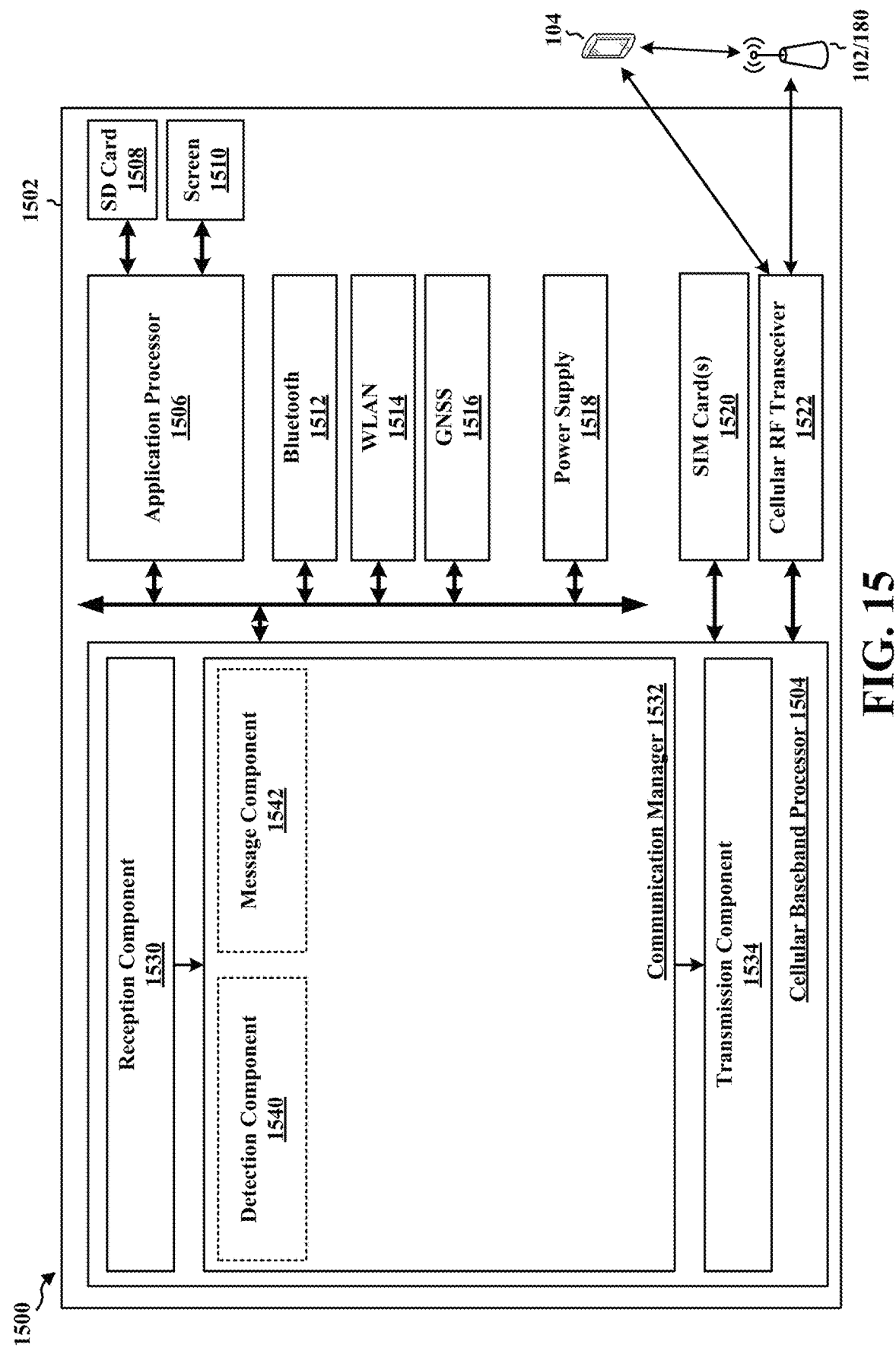
FIG. 15 is a diagram illustrating an example of a hardware implementation for an example apparatus, in accordance with some aspects of the present disclosure.

FIG. 15 is a diagram 1500 illustrating an example of a hardware implementation for an apparatus 1502. The apparatus 1502 is a UE and includes a cellular baseband processor 1504 (also referred to as a modem) coupled to a cellular RF transceiver 1522 and one or more subscriber identity modules (SIM) cards 1520, an application processor 1506 coupled to a secure digital (SD) card 1508 and a screen 1510, a Bluetooth module 1512, a wireless local area network (WLAN) module 1514, a GNSS module 1516, and a power supply 1518. The GNSS module 1516 may comprise a variety of satellite positioning systems. For example, the GNSS module may correspond to Global Positioning System (GPS), Global Navigation Satellite System (GLONASS), Galileo, BeiDou Navigation Satellite System (BDS), Wide Area Augmentation System (WAAS), European Geostationary Navigation Overlay Service (EGNOS), GPS Aided GEO Augmented Navigation (GAGAN), Multifunctional Transport Satellites (MTSAT) Satellite Augmentation System (MSAS), Quasi-Zenith Satellite System (QZSS), or Navigation with Indian Constellation (NavIC). The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components, including a detection component 1540 configured to detect one or more objects and a message component 1542 configured to generate one or more messages (e.g., SDSMs, CPMs, BSMs, etc.). The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., sec 350 of FIG. 3) and include the aforediscussed additional modules of the apparatus 1502.

The apparatus may include additional components that perform each of the blocks of the algorithm in the aforementioned flowcharts of FIG. 13 or 14. As such, each block in the aforementioned flowcharts of FIG. 13 or 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the cellular baseband processor 1504, includes means for receiving, from a first wireless device, a message indicating a threat entity within a threat zone. The threat entity transmits data that interferes with transmission of BSMs. The apparatus includes means for determining a candidate resource of a set of candidate resources on which to transmit a BSM based at least in part on the message indicating information related to the threat entity from the first wireless device. The apparatus includes means for transmitting, to at least a third wireless device, the BSM on a determined candidate resource. The apparatus further includes means for excluding one or more candidate resources in the set of candidate resources based on a projected RSRP for each candidate resource in the set of candidate resources exceeding an RSRP threshold to determine a first subset of candidate resources. The apparatus further includes means for ranking the first subset of candidate resources based on a weighted RSSI ranking to obtain a second subset of candidate resources with a lowest weighted RSSI. The second subset of candidate resources is a portion of the first subset of candidate resources. The apparatus further includes means for selecting a candidate resource from the second subset of candidate resources. The apparatus further includes means for excluding one or more virtually sensed candidate resources in the set of candidate resources having an RSSI that exceeds a pre-filter threshold to obtain a filtered subset of candidate resources that do not exceed the pre-filter threshold. The apparatus further includes means for excluding candidate resources within the filtered subset of candidate resources that do not exceed the pre-filter threshold that exceed an RSRP threshold to obtain a second subset of candidate resources that do not exceed the RSRP threshold. The apparatus further includes means for selecting the candidate resource from the second subset of candidate resources. The aforementioned means may be one or more of the aforementioned components of the apparatus 1502 configured to perform the functions recited by the aforementioned means.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data that cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. In some examples, the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1: An apparatus for detecting one or more timing errors, the apparatus comprising: at least one transceiver; at least one memory; and at least one processor coupled to the at least one transceiver and the at least one memory and configured to: receive, from a navigation system, navigation timestamp information at a first instance and a second instance; determine a navigation system time difference based on the navigation timestamp information at the first instance and the second instance; receive, from a wireless device, network timestamp information at the first instance and the second instance; determine a network time difference based on the network timestamp information at the first instance and the second instance; and determine whether time reporting by the navigation system is correct based on the navigation system time difference and the network time difference.

Aspect 2: The apparatus of Aspect 1, wherein the at least one processor is configured to: associate the network timestamp information at the second instance with the navigation system based on a determination that that the time reporting by the navigation system has not been spoofed.

Aspect 3: The apparatus of any of Aspects 1 to 2, wherein, to determine whether time reporting by the navigation system has been spoofed based on the navigation system time difference and the network time difference, the at least one processor is configured to: determine an absolute difference between the navigation system time difference and the network time difference; and determine that the time reporting by the navigation system has been spoofed based on a determination that the absolute difference exceeds a spoofing threshold.

Aspect 4: The apparatus of Aspect 3, wherein the spoofing threshold is based on at least one of a propagation delay from the wireless device to the apparatus, a Time Division Duplex (TDD) synchronization mismatch associated with the wireless device, a disparity in propagation delays experience by the apparatus during network handovers, a mismatch between network timing of various Mobile Network Operators (MNOs), or any combination thereof.

Aspect 5: The apparatus of any of Aspects 1 to 4, wherein the wireless device is a base station or a Roadside Unit (RSU).

Aspect 6: The apparatus of Aspect 5, wherein base station is a gNodeB (gNB).

Aspect 7: The apparatus of any of Aspects 1 to 6, wherein the navigation system includes a global navigation satellite system (GNSS).

Aspect 8: The apparatus of any of Aspects 1 to 7, wherein the apparatus is a vehicle.

Aspect 9: The apparatus of any of Aspects 1 to 8, wherein the apparatus is an Onboard Unit (OBU).

Aspect 10: A method of detecting one or more timing errors by a device, comprising: receiving, from a navigation system, navigation timestamp information at a first instance and a second instance; determining a navigation system time difference based on the navigation timestamp information at the first instance and the second instance; receiving, from a wireless device, network timestamp information at the first instance and the second instance; determining a network time difference based on the network timestamp information at the first instance and the second instance; and determining whether time reporting by the navigation system is correct based on the navigation system time difference and the network time difference.

Aspect 11: The method of Aspect 10, further comprising: associating the network timestamp information at the second instance with the navigation system based on a determination that that the time reporting by the navigation system has not been spoofed.

Aspect 12: The method of any of Aspects 10 to 11, wherein determining whether time reporting by the navigation system has been spoofed based on the navigation system time difference and the network time difference includes: determining an absolute difference between the navigation system time difference and the network time difference; and determining that the time reporting by the navigation system has been spoofed based on a determination that the absolute difference exceeds a spoofing threshold.

Aspect 13: The method of Aspect 12, wherein the spoofing threshold is based on at least one of a propagation delay from the wireless device to the device, a Time Division Duplex (TDD) synchronization mismatch associated with the wireless device, a disparity in propagation delays experience by the device during network handovers, a mismatch between network timing of various Mobile Network Operators (MNOs), or any combination thereof.

Aspect 14: The method of any of Aspects 10 to 13, wherein the wireless device is a base station or a Roadside Unit (RSU).

Aspect 15: The method of Aspect 14, wherein base station is a gNodeB (gNB).

Aspect 16: The method of any of Aspects 10 to 15, wherein the navigation system includes a global navigation satellite system (GNSS).

Aspect 17: The method of any of Aspects 10 to 16, wherein the device is a vehicle.

Aspect 18: The method of any of Aspects 10 to 17, wherein the device is an Onboard Unit (OBU).

Aspect 19: A non-transitory computer-readable storage medium comprising at least one instruction for causing a computer or processor to perform operations according to any of Aspects 1 to 18.

Aspect 25: An apparatus for detecting one or more timing errors, the apparatus comprising: means for performing operations according to any of Aspects 1 to 18.

Aspect 26: An apparatus for determining one or more location errors, the apparatus comprising: at least one transceiver; at least one memory; and at least one processor coupled to the at least one transceiver and the at least one memory and configured to: transmit, via the at least one transceiver to a device, a first message comprising a first location estimate of the apparatus; receive, via the at least one transceiver from the device, a second message comprising a second location estimate of the apparatus determined by the device; and determine whether the first location estimate is accurate based on the second location estimate.

Aspect 27: The apparatus of Aspect 26, wherein the first message includes a Basic Safety Message (BSM).

Aspect 28: The apparatus of any of Aspects 26 to 27, wherein the second message include a Sensor Data Sharing Message (SDSM).

Aspect 29: The apparatus of any of Aspects 26 to 28, wherein the at least one processor is configured to: update a location estimate of the apparatus based on the second location estimate based on a determination that the first location estimate is not accurate.

Aspect 30: The apparatus of Aspect 29, wherein the at least one processor is configured to: determine a level of trust for the message based on one or more factors associated with at least one of the device and at least one other device.

Aspect 31: The apparatus of Aspect 30, wherein the one or more factors associated with at least one of the device and the at least one other device include at least one of a type of the device, a method used by the device to determine the second location estimate of the apparatus, a reliability of one or more sensors of the device, number of devices reporting an erroneous location estimate of the apparatus, or a combination thereof.

Aspect 32: The apparatus of any of Aspects 30 to 31, wherein, to determine whether the first location estimate is accurate based on the second location estimate, the at least one processor is configured to: update a trust metric based on the one or more factors associated with at least one of the device and the at least one other device; determine whether the trust metric is greater than a threshold; and determine whether the first location estimate is accurate based on whether the updated trust metric is greater than the threshold.

Aspect 33: The apparatus of Aspect 32, wherein the at least one processor is configured to: determine that the first location estimate is inaccurate based on a determination that the trust metric is greater than the threshold.

Aspect 34: The apparatus of any of Aspects 26 to 33, wherein the at least one processor is configured to: determine an additional location estimate of the apparatus based on a location of the device and at least one location of at least one other device and based on an indication of signal strength reported in the second message and at least one indication of signal strength reported in at least one message of the at least one other device.

Aspect 35: The apparatus of any of Aspects 26 to 34, wherein the at least one processor is configured to: determine an additional location estimate of the apparatus based on the second location estimate of the apparatus included in the second message and at least one location estimate of the apparatus included in at least one message of at least one other device.

Aspect 36: The apparatus of Aspect 35, wherein, to determine the additional location estimate of the apparatus, the at least one processor is configured to: determine an average of the second location estimate of the apparatus included in the second message and the at least one location estimate of the apparatus included in the at least one message of the at least one other device.

Aspect 37: The apparatus of any of Aspects 26 to 36, wherein the at least one processor is configured to: determine not to transmit one or more messages based on a determination that the first location estimate is inaccurate.

Aspect 38: The apparatus of any of Aspects 26 to 37, wherein the at least one processor is configured to: reschedule transmission of one or more messages based on a determination that the first location estimate is inaccurate.

Aspect 39: The apparatus of any of Aspects 26 to 38, wherein the second location estimate is based on a Received Signal Strength Indicator (RSSI) metric.

Aspect 40: The apparatus of any of Aspects 26 to 39, wherein the second location estimate is based on a sidelink positioning process.

Aspect 41: The apparatus of any of Aspects 26 to 30, wherein the device is a Road Side Unit (RSU).

Aspect 42: The apparatus of any of Aspects 26 to 41, wherein the device is a vehicle.

Aspect 43: The apparatus of any of Aspects 26 to 42, wherein the apparatus is an On-Board Unit (OBU) of a vehicle.

Aspect 44: A method of determining one or more location errors by a first device, comprising: transmitting, via the at least one transceiver to a second device, a first message comprising a first location estimate of the first device; receive, from the second device, a second message comprising a second location estimate of the first device determined by the second device; and determine whether the first location estimate is accurate based on the second location estimate.

Aspect 45: The method of Aspect 44, wherein the first message includes a Basic Safety Message (BSM).

Aspect 46: The method of any of Aspects 44 to 45, wherein the second message include a Sensor Data Sharing Message (SDSM).

Aspect 47: The method of any of Aspects 44 to 46, wherein the at least one processor is configured to: update a location estimate of the first device based on the second location estimate based on a determination that the first location estimate is not accurate.

Aspect 48: The method of Aspect 47, wherein the at least one processor is configured to: determine a level of trust for the message based on one or more factors associated with at least one of the second device and at least one other device.

Aspect 49: The method of Aspect 48, wherein the one or more factors associated with at least one of the second device and the at least one other device include at least one of a type of the second device, a method used by the second device to determine the second location estimate of the first device, a reliability of one or more sensors of the second device, number of devices reporting an erroneous location estimate of the first device, or a combination thereof.

Aspect 50: The method of any of Aspects 48 to 49, wherein, to determine whether the first location estimate is accurate based on the second location estimate, the at least one processor is configured to: update a trust metric based on the one or more factors associated with at least one of the second device and the at least one other device; determine whether the trust metric is greater than a threshold; and determine whether the first location estimate is accurate based on whether the updated trust metric is greater than the threshold.

Aspect 51: The method of Aspect 50, wherein the at least one processor is configured to: determine that the first location estimate is inaccurate based on a determination that the trust metric is greater than the threshold.

Aspect 52: The method of any of Aspects 44 to 51, wherein the at least one processor is configured to: determine an additional location estimate of the first device based on a location of the second device and at least one location of at least one other device and based on an indication of signal strength reported in the second message and at least one indication of signal strength reported in at least one message of the at least one other device.

Aspect 53: The method of any of Aspects 44 to 52, wherein the at least one processor is configured to: determine an additional location estimate of the first device based on the second location estimate of the first device included in the second message and at least one location estimate of the first device included in at least one message of at least one other device.

Aspect 54: The method of Aspect 53, wherein, to determine the additional location estimate of the first device, the at least one processor is configured to: determine an average of the second location estimate of the first device included in the second message and the at least one location estimate of the first device included in the at least one message of the at least one other device.

Aspect 55: The method of any of Aspects 44 to 54, wherein the at least one processor is configured to: determine not to transmit one or more messages based on a determination that the first location estimate is inaccurate.

Aspect 56: The method of any of Aspects 44 to 55, wherein the at least one processor is configured to: reschedule transmission of one or more messages based on a determination that the first location estimate is inaccurate.

Aspect 57: The method of any of Aspects 44 to 56, wherein the second location estimate is based on a Received Signal Strength Indicator (RSSI) metric.

Aspect 58: The method of any of Aspects 44 to 57, wherein the second location estimate is based on a sidelink positioning process.

Aspect 59: The method of any of Aspects 44 to 58, wherein the second device is a Road Side Unit (RSU).

Aspect 60: The method of any of Aspects 44 to 59, wherein the second device is a vehicle.

Aspect 61: The method of any of Aspects 44 to 60, wherein the first device is an On-Board Unit (OBU) of a vehicle.

Aspect 62: A non-transitory computer-readable storage medium comprising at least one instruction for causing a computer or processor to perform operations according to any of Aspects 26 to 61.

Aspect 63: An apparatus for detecting one or more timing errors, the apparatus comprising: means for performing operations according to any of Aspects 26 to 61.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. An apparatus for detecting one or more timing errors, the apparatus comprising:
    at least one global navigation satellite system (GNSS) transceiver configured to receive, from a navigation system, navigation timestamp information at a first instance and a second instance;
    at least one transceiver configured to receive, from a wireless device, network timestamp information at the first instance and the second instance;
    at least one memory; and
    at least one processor coupled to the at least one GNSS transceiver, the at least one transceiver, and the at least one memory, the at least one processor configured to:
        determine a navigation system time difference based on the navigation timestamp information at the first instance and the second instance;
        determine a network time difference based on the network timestamp information at the first instance and the second instance; and
        determine whether time reporting by the navigation system is correct or has been spoofed based on the navigation system time difference and the network time difference.

2. The apparatus of claim 1, wherein the at least one processor is configured to:
    associate the network timestamp information at the second instance with the navigation system based on a determination that that the time reporting by the navigation system has not been spoofed.

3. The apparatus of claim 1, wherein, to determine whether time reporting by the navigation system has been spoofed based on the navigation system time difference and the network time difference, the at least one processor is configured to:
    determine an absolute difference between the navigation system time difference and the network time difference; and
    determine that the time reporting by the navigation system has been spoofed based on a determination that the absolute difference exceeds a spoofing threshold.

4. The apparatus of claim 3, wherein the spoofing threshold is based on at least one of a propagation delay from the wireless device to the apparatus, a Time Division Duplex (TDD) synchronization mismatch associated with the wireless device, a disparity in propagation delays experience by the apparatus during network handovers, a mismatch between network timing of various Mobile Network Operators (MNOs), or any combination thereof.

5. The apparatus of claim 1, wherein the wireless device is a base station or a Roadside Unit (RSU).

6. The apparatus of claim 5, wherein base station is a gNodeB (gNB).

7. The apparatus of claim 1, wherein the navigation system includes a global navigation satellite system (GNSS).

8. The apparatus of claim 1, wherein the apparatus is a vehicle.

9. The apparatus of claim 1, wherein the apparatus is an Onboard Unit (OBU).

10. A method of detecting one or more timing errors by a first wireless device, comprising:
    receiving, by at least one global navigation satellite system (GNSS) transceiver from a navigation system, navigation timestamp information at a first instance and a second instance;
    determining a navigation system time difference based on the navigation timestamp information at the first instance and the second instance;
    receiving, by at least one transceiver from a second wireless device, network timestamp information at the first instance and the second instance;
    determining a network time difference based on the network timestamp information at the first instance and the second instance; and
    determining whether time reporting by the navigation system is correct or has been spoofed based on the navigation system time difference and the network time difference.

11. The method of claim 10, further comprising:
    associating the network timestamp information at the second instance with the navigation system based on a determination that that the time reporting by the navigation system has not been spoofed.

12. The method of claim 10, wherein determining whether time reporting by the navigation system has been spoofed based on the navigation system time difference and the network time difference includes:
    determining an absolute difference between the navigation system time difference and the network time difference; and determining that the time reporting by the navigation system has been spoofed based on a determination that the absolute difference exceeds a spoofing threshold.

13. The method of claim 12, wherein the spoofing threshold is based on at least one of a propagation delay from the second wireless device to the first wireless device, a Time Division Duplex (TDD) synchronization mismatch associated with the second wireless device, a disparity in propagation delays experience by the first wireless device during network handovers, a mismatch between network timing of various Mobile Network Operators (MNOs), or any combination thereof.

14. The method of claim 10, wherein the second wireless device is a base station or a Roadside Unit (RSU).

15. The method of claim 14, wherein base station is a gNodeB (gNB).

16. The method of claim 10, wherein the navigation system includes a global navigation satellite system (GNSS).

17. The method of claim 10, wherein the first wireless device is a vehicle.

18. The method of claim 10, wherein the first wireless device is an Onboard Unit (OBU).

19. A non-transitory computer-readable storage medium of a first wireless device comprising at least one instruction for causing a computer or processor to:
receive, from a navigation system via at least one global navigation satellite system (GNSS) transceiver, navigation timestamp information at a first instance and a second instance;
determine a navigation system time difference based on the navigation timestamp information at the first instance and the second instance;
receive, from a second wireless device via at least one transceiver, network timestamp information at the first instance and the second instance;
determine a network time difference based on the network timestamp information at the first instance and the second instance; and
determine whether time reporting by the navigation system is correct based on the navigation system time difference and the network time difference.

20. The computer-readable storage medium of claim 19, wherein the at least one instruction is configured to cause the computer or processor to:
associate the network timestamp information at the second instance with the navigation system based on a determination that that the time reporting by the navigation system has not been spoofed.

21. The computer-readable storage medium of claim 19, wherein, to determine whether time reporting by the navigation system has been spoofed based on the navigation system time difference and the network time difference, the at least one instruction is configured to cause the computer or processor to:
determine an absolute difference between the navigation system time difference and the network time difference; and
determine that the time reporting by the navigation system has been spoofed based on a determination that the absolute difference exceeds a spoofing threshold.

22. The computer-readable storage medium of claim 21, wherein the spoofing threshold is based on at least one of a propagation delay from the second wireless device to the first wireless device, a Time Division Duplex (TDD) synchronization mismatch associated with the second wireless device, a disparity in propagation delays experience by the first wireless device during network handovers, a mismatch between network timing of various Mobile Network Operators (MNOs), or any combination thereof.

23. The computer-readable storage medium of claim 19, wherein the second wireless device is a base station or a Roadside Unit (RSU).

24. The computer-readable storage medium of claim 23, wherein base station is a gNodeB (gNB).

25. The non-transitory computer-readable storage medium of claim 19, wherein the navigation system includes a global navigation satellite system (GNSS).

26. The non-transitory computer-readable storage medium of claim 19, wherein the first wireless device is a vehicle.

27. The non-transitory computer-readable storage medium of claim 19, wherein the first wireless device is an Onboard Unit (OBU).

* * * * *